US006898353B2

(12) United States Patent
Li

(10) Patent No.: US 6,898,353 B2
(45) Date of Patent: May 24, 2005

(54) LENSED TAPERED OPTICAL WAVEGUIDE

(75) Inventor: Kenneth K. Li, Arcadia, CA (US)

(73) Assignee: Wavien, Inc., Santa Clarita, CA (US)

( * ) Notice: Subject to any disclaimer, the term of this patent is extended or adjusted under 35 U.S.C. 154(b) by 0 days.

(21) Appl. No.: 10/950,629

(22) Filed: Sep. 28, 2004

(65) Prior Publication Data

US 2005/0047723 A1 Mar. 3, 2005

Related U.S. Application Data

(62) Division of application No. 10/155,234, filed on May 28, 2002, now Pat. No. 6,829,412
(60) Provisional application No. 60/293,181, filed on May 25, 2001, provisional application No. 60/294,590, filed on Jun. 1, 2001, and provisional application No. 60/296,146, filed on Jun. 7, 2001.

(51) Int. Cl.$^7$ ................................................. G02B 6/26
(52) U.S. Cl. ............................. 385/43; 385/31; 385/33; 385/35; 385/901; 362/346; 362/518
(58) Field of Search ............................... 385/31–38, 43, 385/901; 362/296, 297, 302, 346, 518; 250/227.24

(56) References Cited

U.S. PATENT DOCUMENTS

| 5,434,407 | A | 7/1995 | Bauer et al. |
| 6,227,682 | B1 | 5/2001 | Li |
| 6,634,759 | B1 | * 10/2003 | Li ............................... 362/346 |
| 6,829,412 | B2 | * 12/2004 | Li ............................... 385/31 |

FOREIGN PATENT DOCUMENTS

| DE | 1 161 826 B | 1/1964 |
| WO | WO 00/67057 A1 | 11/2000 |
| WO | WO 01/02774 A1 | 1/2001 |

* cited by examiner

Primary Examiner—Phan T. H. Palmer
(74) Attorney, Agent, or Firm—Fulbright & Jaworski LLP

(57) ABSTRACT

An optical coupling element for use in large numerical aperture collecting and condensing systems. The optical coupling element includes a curved surface such as a lens at the output of a tapered light pipe (TLP). The TLP in combination with the curved surface alters the divergence angle and the area of the light exiting the curved surface. Electromagnetic radiation emitted by a source is collected and focused onto a target by positioning the source of electromagnetic radiation substantially at a first focal point of a primary reflector so that the primary reflector produces rays of radiation reflected from the primary reflector that converge at a second focal point of the secondary reflector. The optical coupling element is positioned so that its input end is substantially proximate with the second focal point of the secondary reflector. The converging rays of radiation reflected from the secondary reflector pass through input end and are transmitted towards the curved surface, where their divergence angle and area are adjusted.

42 Claims, 29 Drawing Sheets

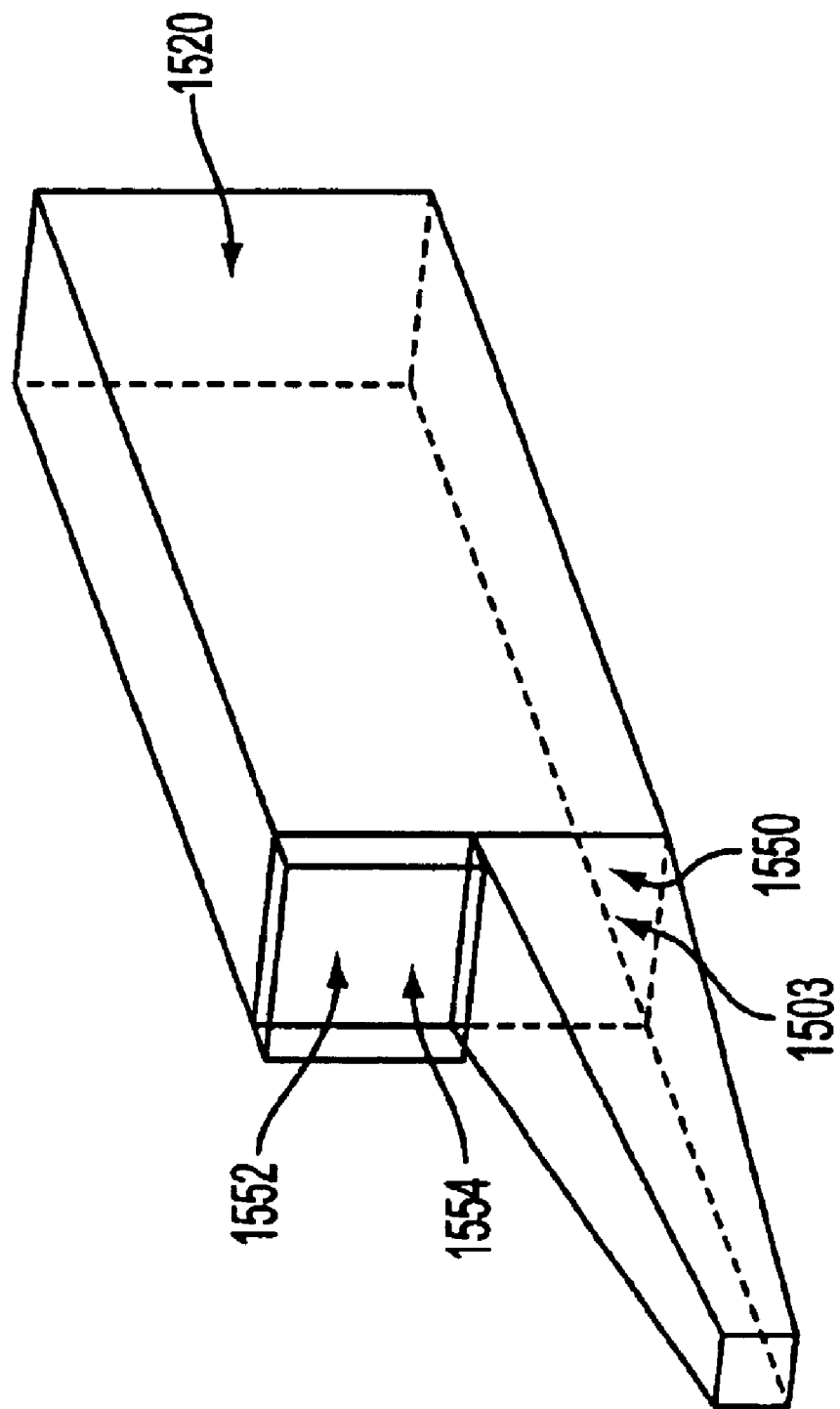

 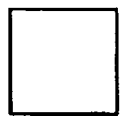 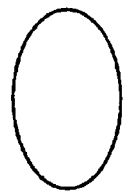 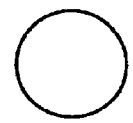
FIG. 24(a)  FIG. 24(b)  FIG. 24(c)  FIG. 24(d)
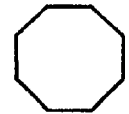 
FIG. 24(e)  FIG. 24(f)

LENSED TAPERED OPTICAL WAVEGUIDE

CROSS-REFERENCE TO RELATED APPLICATIONS

This application is a divisional of U.S. application Ser. No. 10/155,234, filed May 28, 2002 now U.S. Pat. No. 6,829,412, which claims priority to U.S. Provisional Application Ser. No. 60/293,181, filed May 25, 2001, and U.S. Provisional Application Ser. No. 60/294,590, filed Jun. 1, 2001 and U.S. Provisional Application Ser. No. 60/296,146, filed Jun. 7, 2001.

BACKGROUND OF THE INVENTION

1. Field of the Invention

This invention relates to waveguides that collect and condense light from a light source, transforming the area and divergence angle of the light from their input to their output with minimum loss of brightness.

2. Description of the Related Art

The objective of systems that collect, condense, and couple electromagnetic radiation into a target such as a standard waveguide, e.g. a single fiber or fiber bundle, or output electromagnetic radiation to the input of a projection engine, is to maximize the brightness of the electromagnetic radiation at the target. There are several common systems for collecting and condensing light from a lamp for such illumination and projection applications.

One optical collection and condensing systems, U.S. patent application Ser. No. 09/604,921 now U.S. Pat. No. 6,672,740, the disclosure of which is incorporated by reference, provides a dual-paraboloid reflector system. This optical collection and condensing system, as illustrated in FIG. 1(a), uses two generally symmetric paraboloid reflectors 10, 11 that are positioned so that light reflected from the first reflector 10 is received in a corresponding section of the second reflector 11. In particular, light emitted from a light source 12, such as an arc lamp, is collected by the first parabolic reflector 10 and collimated along the optical axis toward the second reflector 11. The second reflector 11 receives the collimated beam of light and focuses this light at the target 13 positioned at the focal point.

The optical system of FIG. 1(a) may employ a retro-reflector 14 in conjunction with the first paraboloid reflector 10 to capture radiation emitted by the light source 12 in a direction away from the first paraboloid reflector 10 and reflect the captured radiation back through the light source 12. In particular, the retro-reflector 14 has a generally spherical shape with a focus located substantially near the light source 12 (i.e., at the focal point of the first paraboloid reflector) toward the first paraboloid reflector to thereby increase the intensity of the collimated rays reflected therefrom.

In FIG. 1(a) is shown light paths for three different rays (a, b, and c) emitted from the light source 12 when viewed in a direction normal to the lamp axis. The light output from a lamp subtends an angle of about 90° around an axis normal to the lamp, as indicated by rays a and c in FIG. 1(a).

The light output from a lamp subtends a cone angle of nearly 180°, on the other hand, when viewed in a direction parallel to the lamp axis, as indicated by rays a' and c' in FIG. 1(b).

One shortcoming of the above described on-axis, dual-paraboloid optical system is that a large angle is produced between rays a and c, and rays a' and c', at a target. As a result, the rays strike the target 13 at a high angle of incidence relative to the target surface. Thus, the numerical aperture (NA) at the input of the target 13 may be very large, sometimes as high as 1.0, while the area upon which the light is focused is small. A large numerical aperture combined with a small area may be unsuitable for the optical components to which light from the system may be coupled. If a different, e.g. smaller, numerical aperture is desired, some means of transforming the area and divergence angle of the light with minimum loss of brightness may be incorporated into the device.

Representative means of transforming input areas and divergence angles of light are lenses and tapered optical waveguides, also known as tapered light pipes (TLP). While lenses provide an efficient means of transforming input areas and divergence angles of light, they require a certain amount of space in which to operate. Also, they are not well adapted to large numerical apertures. Consequently, tapered light pipes are often used instead of lenses. Tapered light pipes, however, must be relatively lengthy to transform light efficiently.

In U.S. application Ser. No. 09/669,841 now U.S. Pat. No. 6,634,759, the disclosure of which is incorporated by reference, a dual ellipsoidal reflector system is described as providing 1:1 magnification for small light source target. This optical collection and condensing system, as illustrated in FIG. 2, uses two generally symmetric ellipsoid reflectors 20, 21 that are positioned so that light reflected from the first reflector 20 is received in a corresponding section of the second reflector 21. In particular, light emitted from the light source 22 is collected by the first elliptical reflector 20 and focused onto the optical axis 25 toward the second reflector 21. The second reflector 21 receives the focused beam of light and refocuses this light at the target 23 positioned at the focal point.

As may be seen in FIG. 2, the dual-ellipsoid system suffers from the same disadvantage as the dual-paraboloid system in that a large angle is produced between ray a and ray c at the target. As a result, ray a and ray c also strike the target at large angles of incidence relative to the target surface, requiring further transformation of the input area and divergence angle of the light.

Another embodiment of the dual-ellipsoid system may be seen in FIG. 3. This dual-ellipsoid system suffers from the same disadvantage as the above-mentioned dual-paraboloid and dual-ellipsoid systems in that a large angle is produced between ray a and ray c at the target. Here too, ray a and ray c strike the target at large angles of incidence, requiring further transformation of the input area and divergence angle of the light.

In practice, light with such a large NA may be transformed such that the NA is smaller and the area is larger following the brightness principle. The transformation may be performed with, e.g. a tapered light pipe.

A standard long tapered light pipe 40a with a flat input surface 41a for use with the above systems is shown in FIG. 4(a). A standard short tapered light pipe 40b with a flat input surface 41b for use with the above systems is shown in FIG. 4(b). Both the long and the short tapered light pipes may be used to transform light having a small area $d_1$ and large numerical aperture $NA_1$ at the input 41 to a larger area $d_2$ and smaller numerical aperture $NA_2$ at the output 42. If light 43 impinges the tapered light pipe 40 at large angles of incidence 44 as shown in FIG. 4, the tapering of the light pipe 40 will transform the large input angles 44 into smaller output angles 45. The degree to which the angles are transformed will depend on the degree of taper. For ideal tapered light pipes, brightness is conserved. Consequently, for an ideal tapered light pipe, the product of the numerical aperture $NA_1$ and the area $d_1$ of the light at the input 41 will be equal to the product of the numerical aperture $NA_2$ and the area $d_2$ of the light at the output 42. To wit:

$$d1*NA1 = d2*NA2 \quad (1)$$

In actual implementation, optimizations need to be performed such that the optimized dimensions may deviate from the ideal configurations.

The output angles 45 are designed for a specific system by matching the tapered light pipe to an output device. In designing a tapered light pipe, three of the variables will often be known, and the fourth can be calculated. In one example, a tapered light pipe of length 75.0 mm was designed with $d_1=3.02$ mm, $NA_1=0.7$, and $d_2=9.0$ mm. The output numerical aperture $NA_2$ is thus predicted to be 0.23. Upon fabricating the tapered light pipe, however, the actual numerical aperture at the output was found to be 0.26, larger than the predicted 0.23. Such a large numerical aperture will result in a loss of coupling efficiency in subsequent optical elements. But if the input area is reduced to reduce the numerical aperture at the output, less light will be coupled into the tapered light pipe in the first place, reducing the overall collection efficiency of the system.

The reason the numerical aperture at the output is larger than predicted is due to an assumption underlying equation (1) to the effect that an ideal tapered light pipe is of infinite length. For a tapered light pipe of infinite length, the angle of taper would be zero. In actuality, however, the angle of taper must be some number larger than zero, since the tapered light pipe is of finite length, and so the actual numerical aperture differs from that predicted by the equation. As the tapered light pipe gets longer, the actual numerical aperture converges to the predicted numerical aperture. A longer tapered light pipe, however, may require more space.

Furthermore, when the output numerical aperture of a tapered light pipe such as those shown in FIG. 4 was measured by placing a pinhole against the output face, an angle shift was observed which indicated that the output light may not be telecentric.

In FIG. 5 is shown a radiation envelope of a typical arc lamp. Radiation tends to be emitted by an arc lamp in a pattern that subtends an angle of ±90° in a plane parallel to the axis of the lamp (z-axis in FIG. 5), and 360° around the axis of the lamp. If the envelope were projected along the z-axis onto a flat surface, it would appear to be circular. Light focused at the target of a dual paraboloid or dual ellipsoid reflector configuration with retro-reflectors from such a lamp may, e.g. have an elliptical numerical aperture (NA) that varies from 1.0 in the z-direction to 0.7 in, e.g. the x-direction.

A numerical aperture (NA) of a system, such as the dual paraboloid system shown in FIG. 1(*a*) may, however, be rectangular as shown in FIG. 6, rather than circular or elliptical. The NA along the diagonal of a cross-section of an input surface may thus be larger than the NA in either the x or z directions. When the light is transformed by, e.g. a TLP, a similar rectangular or square angular distribution may be obtained at the output, as shown in FIG. 7, which is a square in this example. Since the radiation input to the system has a circular or elliptical distribution, however, a circular NA, such as the one shown in FIG. 8, or an elliptical NA may be more appropriate for common optical systems.

FIG. 9 shows various configurations of input apertures for a target. The input apertures generally have aspect ratios greater than one. The aspect ratios of the input apertures may thus be made to be similar to the aspect ratio of the emission area of an arc lamp viewed from the side. Matching an input aperture at the target to an arc, however, does not necessarily match it with the final output device, e.g. a fiber or projection engine. It would be desirable, therefore, for a transforming device to transform the aspect ratio and the NA of the input light into a satisfactory aspect ratio and NA for the output device.

Therefore, there remains a need to provide an efficient means of transforming input area and divergence angle of light, in a relatively short space, such that the output is telecentric and has a circular or elliptical NA distribution that may be symmetric.

SUMMARY

An optical coupling element for use in large numerical aperture collecting and condensing systems. The optical coupling element includes a tapered light pipe with an input end and a lens on the output side. The input end may be octagonal. The optical coupling element may be placed at the input end of a fiber, fiber bundle, or projection engine. The tapered light pipe and the lens adjusts the area of the area of the light and its numerical aperture to suit the fiber, fiber bundle, or projection engine. The lens can also parallelize or collimate the light to produce a telecentric output.

In particular, a collecting and condensing system comprises a source of electromagnetic radiation, an optical coupling element to be illuminated with at least a portion of the electromagnetic radiation emitted by the source, the optical coupling element comprising a tapered light pipe with a curved surface at its output end, a reflector having a first and second focal points, the source being located proximate to the first focal point of the reflector to produce rays of radiation that reflect from the first focal point to the second focal point and converge substantially at the second focal point; and wherein the input end of the tapered light pipe may be located proximate to the second focal point of the reflector to collect the electromagnetic radiation.

Electromagnetic radiation emitted by the source of electromagnetic radiation may be collected and focused onto the input end of a tapered light pipe by positioning the source of electromagnetic radiation substantially at a first focal point of a reflector so that the source produces rays of radiation that are reflected from the reflector, converging substantially at a second focal point of the reflector. An optical coupling element including a tapered light pipe having a curved output surface may be positioned so that the input end of the tapered light pipe may be substantially proximate with the second focal point of the reflector, whereby the converging rays of radiation reflected from the reflector pass through the tapered light pipe and curved surface, such that the divergence angle and the area of the light may be adjusted to suit further elements such as fiber optics, waveguides, polarization beam splitters, or projection engines.

The above and other features and advantages of the present invention will be further understood from the following description of the preferred embodiments thereof, taken in conjunction with the accompanying drawings.

BRIEF DESCRIPTION OF THE DRAWINGS

FIG. 1(*b*) shows a detail of the lamp and the first reflector of the embodiment shown in FIG. 1(*a*), viewed along the reflector axis;

FIG. 24 shows some representative cross-sections of an output surface for use with an embodiment of the invention;

DETAILED DESCRIPTION OF THE PREFERRED EMBODIMENTS

Figure 1A:
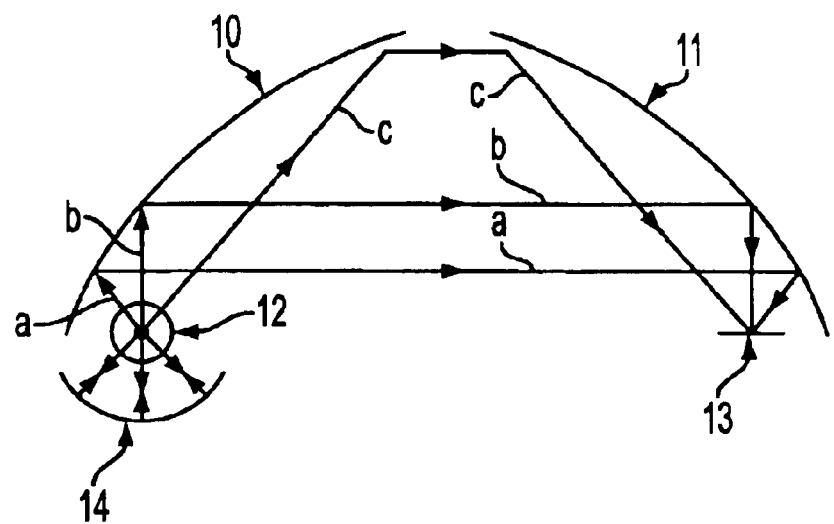
FIG. 1(*a*) shows a schematic diagram of a collecting and condensing system for use with an embodiment of the invention.
Figure 1B:
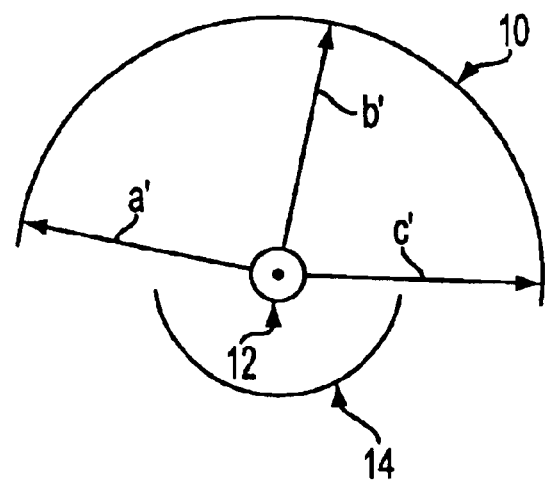
Figure 2:
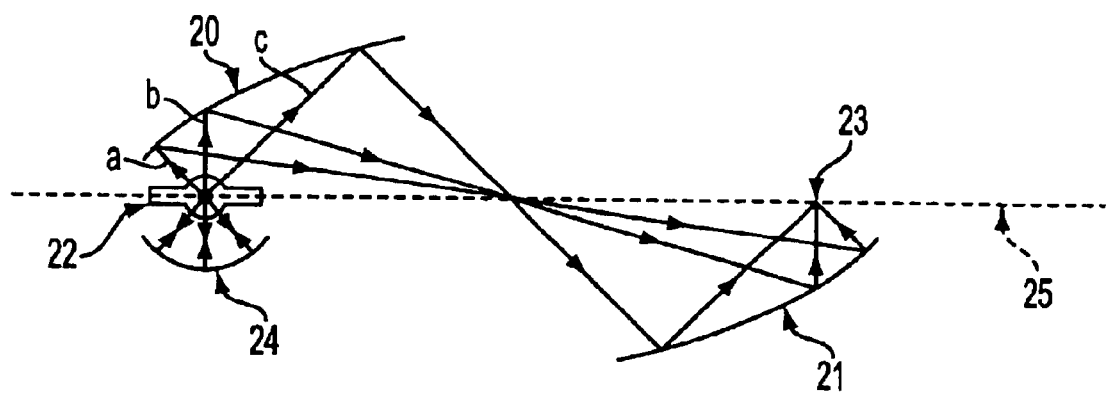
FIG. 2 shows a schematic diagram of a collecting and condensing system for use with an embodiment of the invention.
Figure 3:
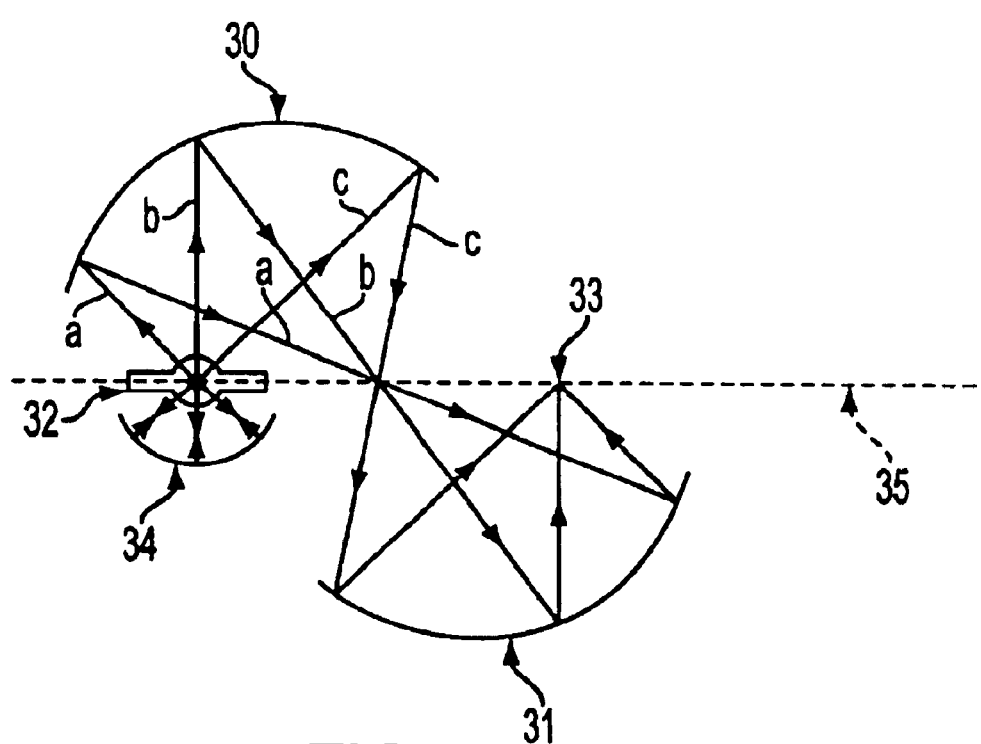
FIG. 3 shows a schematic diagram of a variation of the collecting and condensing system shown in FIG. 2.
Figure 4A:
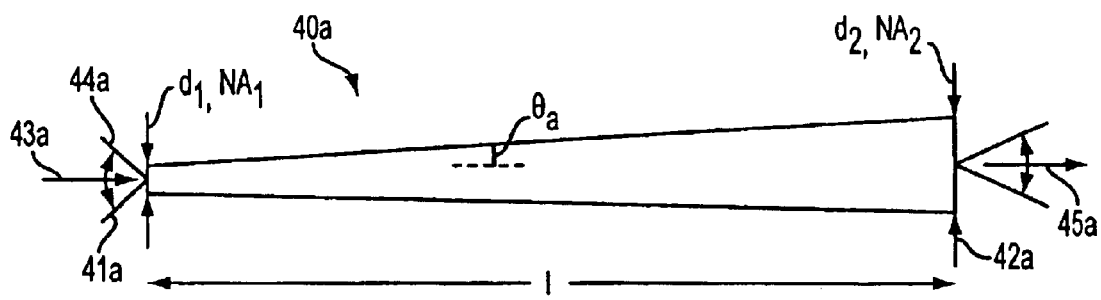
FIGS. 4(a) and 4(b) shows schematic diagrams of conventional tapered light pipes.
Figure 4B:
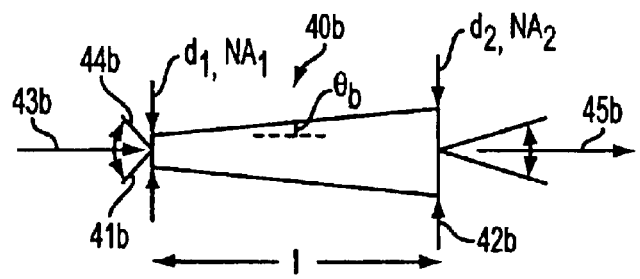
Figure 5:
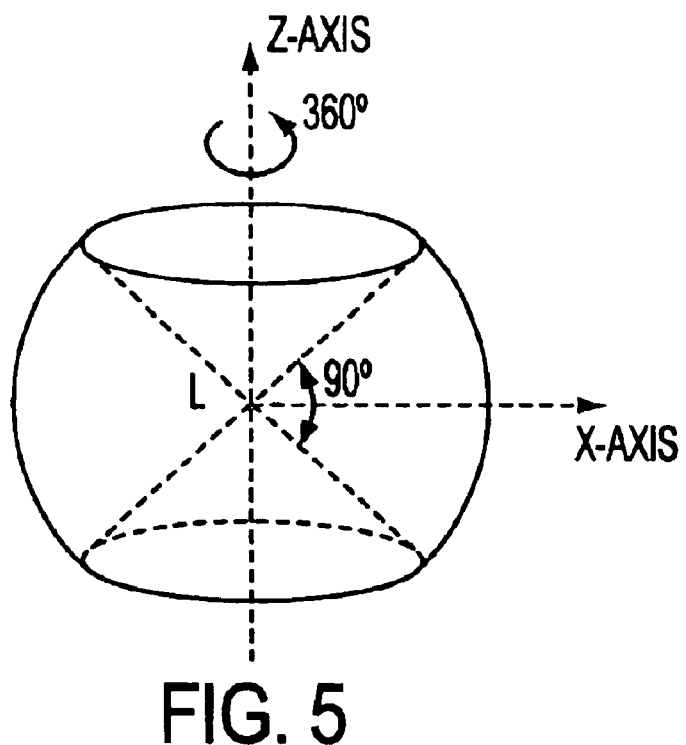
FIG. 5 shows a representative radiation envelope of a lamp for use with an embodiment of the invention.
Figure 6:
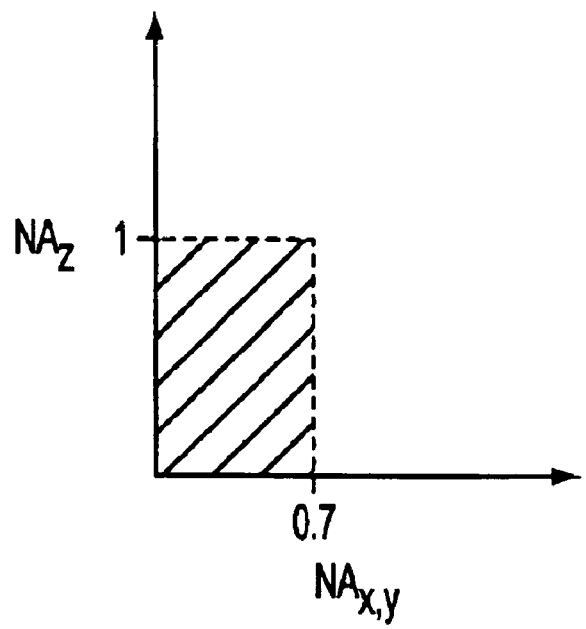
FIG. 6 shows a diagram of a representative numerical aperture.
Figure 7:
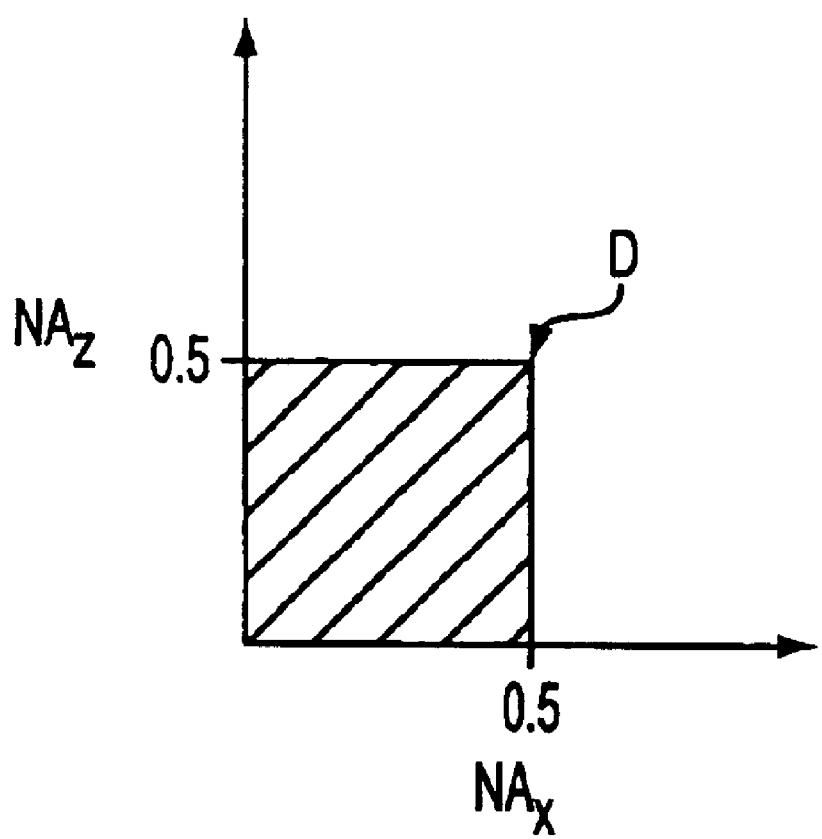
FIG. 7 shows a diagram of a representative numerical aperture.
Figure 8:
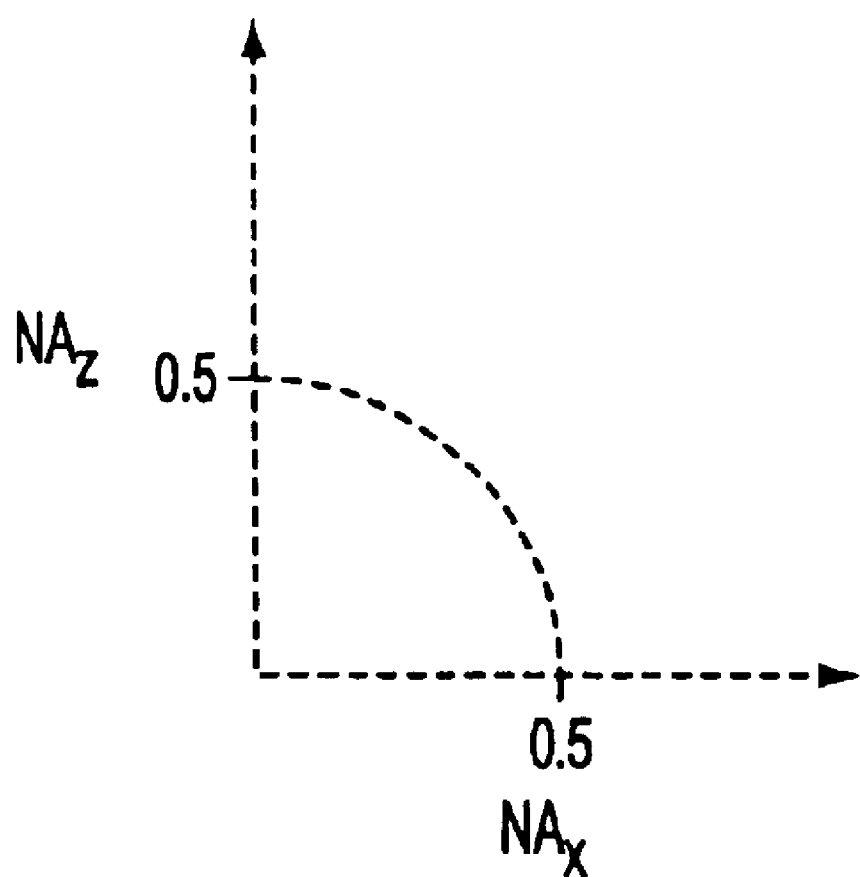
FIG. 8 shows a diagram of a representative numerical aperture.
Figure 9A:
FIG. 9 shows various configurations of input apertures.
Figure 9B:
Figure 9C:
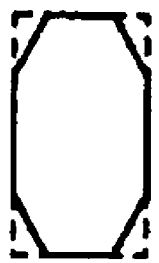
Figure 10A:
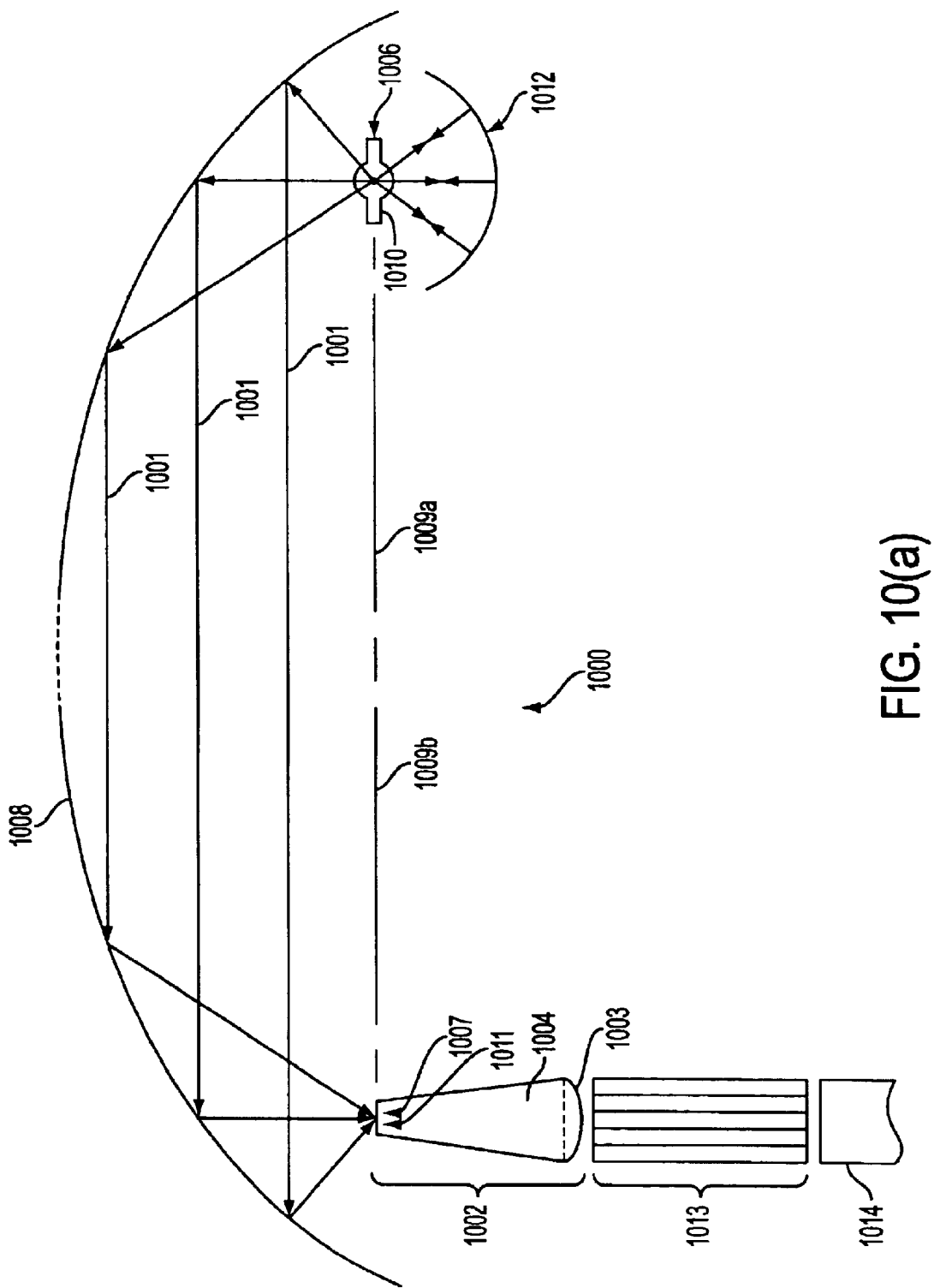
FIG. 10a shows a collecting and condensing system according to a first, third, and fourth embodiments of the invention.
Figure 10B:
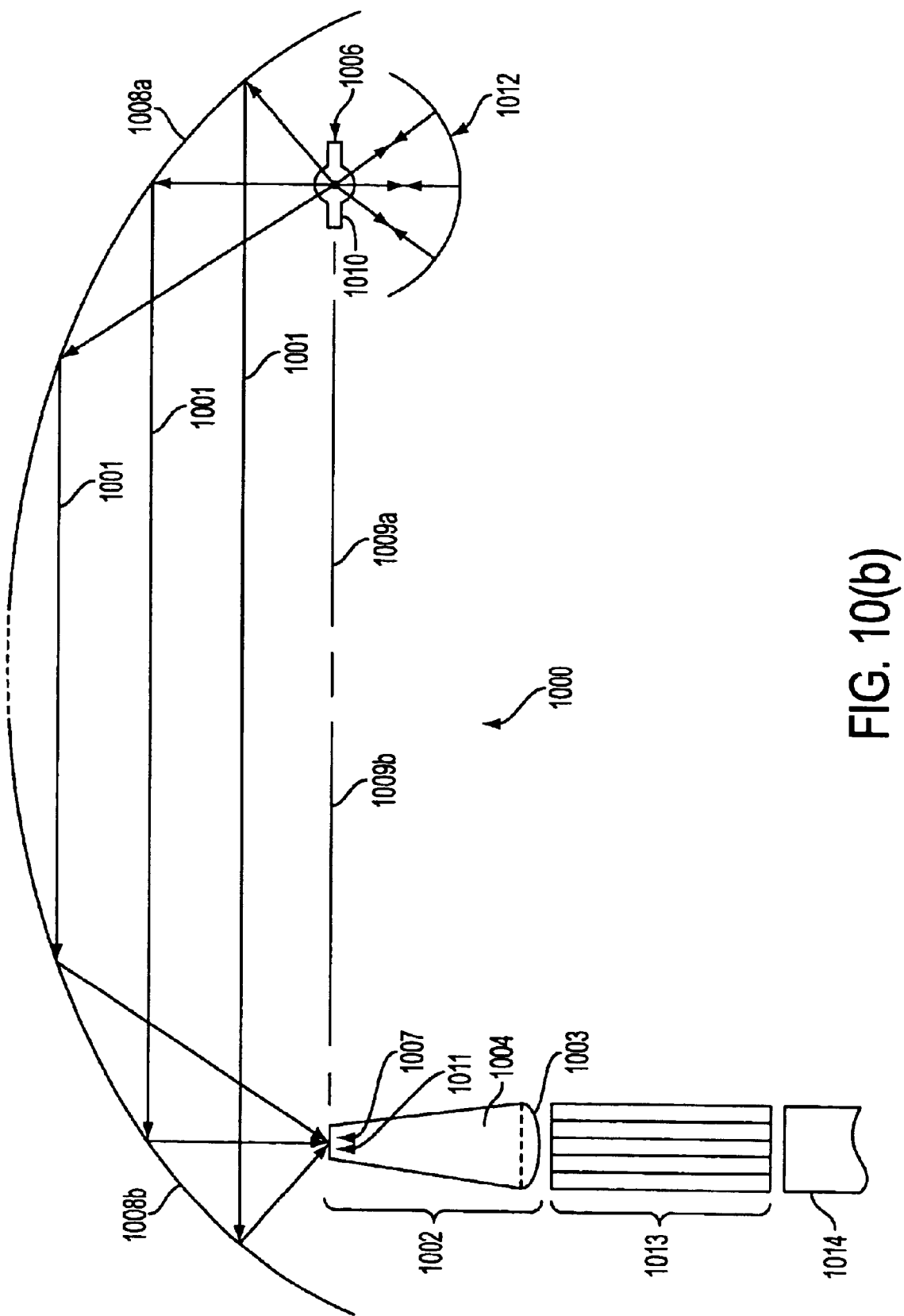
FIG. 10b shows a collecting and condensing system according to a second embodiment of the invention.
Figure 20A:
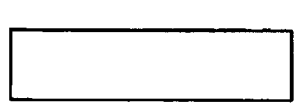
FIG. 20 shows some representative tapers for use with an embodiment of the invention.
Figure 20B:
Figure 20C:
Figure 20D:
Figure 20E:
Figure 21A:
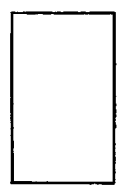
FIG. 21 shows some representative cross-sections of an output end for use with an embodiment of the invention.
Figure 21B:
Figure 21C:
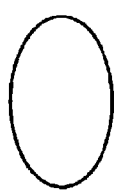
Figure 21D:
Figure 21E:
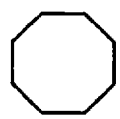
Figure 21F:

In FIGS. 10a and 10b is shown a collecting and condensing system 1000 used to launch electromagnetic radiation 1001 into an optical coupling element 1002 composed of a curved surface 1003 at an output end 1015 of a tapered light pipe (TLP) 1004. TLP 1004 may be, e.g. a straight light pipe (SLP), as shown in FIG. 20a, or it may have a profile such as an increasing taper, as shown in FIG. 20b, a decreasing taper, as shown in FIG. 20c, or a curved taper, as shown in FIGS. 20d and 20e.

Various cross-sections of output end 1015 are shown in FIG. 21. Output end 1015 may have, e.g. a rectangular cross-section as shown in FIG. 21a, a square cross-section as shown in FIG. 21b, an elliptical cross-section as shown in FIG. 21c, a circular cross-section as shown in FIG. 21d, an octagonal cross-section as shown in FIG. 21e, a hexagonal cross-section as shown in FIG. 21f, or a polygonal cross-section. Curved surface 1003 may be, e.g. an integral part of the TLP 1004 or a separate lens attached fixedly to an output end 1015 of TLP 1004.

Figure 22A:
FIG. 22 shows some representative cross-sections of an input end for use with an embodiment of the invention.
Figure 22B:
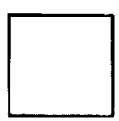
Figure 22C:
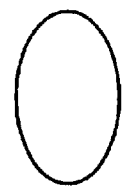
Figure 22D:
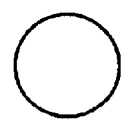
Figure 22E:
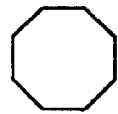
Figure 22F:
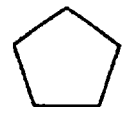

TLP 1004 has an input end 1007. Various cross-sections of input end 1007 are shown in FIG. 22. Input end 1007 may have, e.g. may have, e.g. a rectangular cross-section as shown in FIG. 22a, a square cross-section as shown in FIG. 22b, an elliptical cross-section as shown in FIG. 22c, a circular cross-section as shown in FIG. 22d, an octagonal cross-section as shown in FIG. 22e, a hexagonal cross-section as shown in FIG. 22f, or a polygonal cross-section, or another cross-section suitable for coupling radiation efficiently into TLP 1004.

In a first embodiment, as shown in FIG. 10a, the collecting and condensing system 1000 has a reflector 1008 having a first focal point 1010 and a second focal point 1011 arranged around a source 1006 of electromagnetic radiation 1001 so that source 1006 may be located substantially proximate to first focal point 1010 of reflector 1008. Reflector 1008 may be, e.g. a substantially ellipsoidal, toroidal, spheroidal, or paraboloidal surface of revolution. Source 1006 produces rays of electromagnetic radiation 1001 that are reflected by reflector 1008 toward second focal point 1011, converging substantially at second focal point 1011.

In a second embodiment, as shown in FIG. 10b, reflector 1008 comprises a primary reflector 1008a having a first optical axis 1009a and a first focal point 1010 substantially on the first optical axis 1009a, and a secondary reflector 1008b having a second optical axis 1009b and a second focal point 1011 substantially on the second optical axis 1009b which may be arranged substantially symmetrically to primary reflector 1008a. Primary reflector 1008a may be arranged around source 1006, so that source 1006 may be located substantially proximate to first focal point 1010 of primary reflector 1008a. First optical axis 1009a may be substantially collinear with second optical axis 1009b. Source 1006 produces rays of electromagnetic radiation 1001 that are reflected by primary reflector 1008a toward secondary reflector 1008b, converging substantially at second focal point 1011.

Both of reflectors 1008a and 1008b may be, e.g. substantially ellipsoidal or paraboloidal surfaces of revolution. In the alternative, one of reflectors 1008a and 1008b may be e.g. a substantially ellipsoidal surface of revolution while the other may be a substantially hyperboloid surface of revolution.

In either of the abovementioned embodiments, optical coupling element 1002 may be placed so that input end 1007 may be substantially proximate to second focal point 1011 so that at least a portion of the electromagnetic radiation 1001 emitted by the source 1006 may be coupled into input end 1007.

Figure 25:
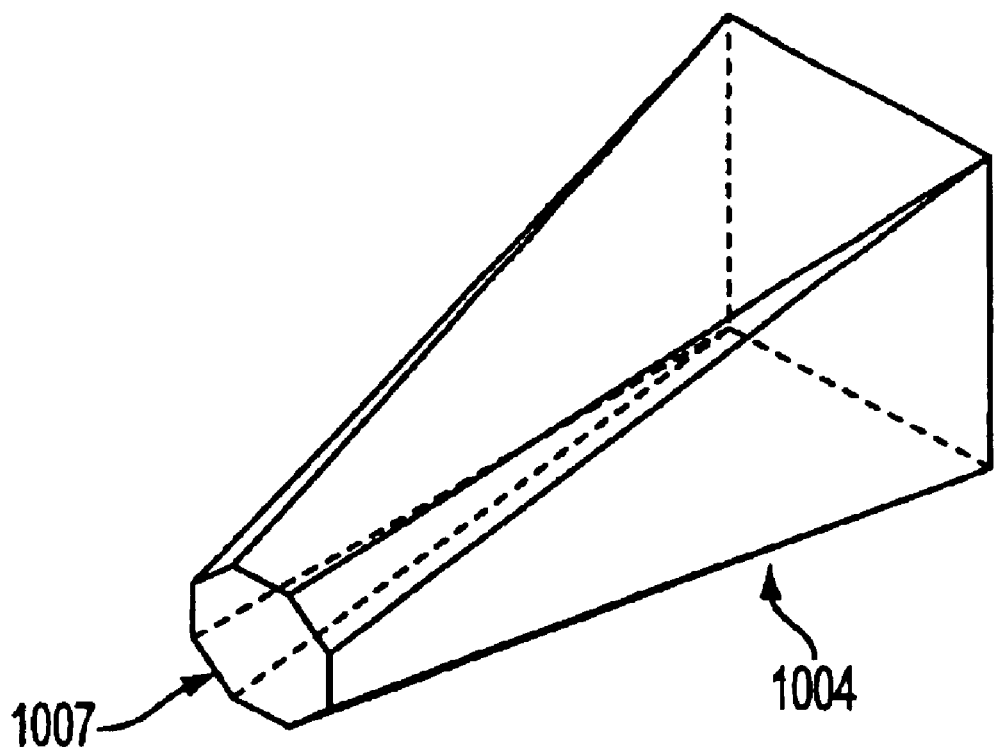
FIG. 25 shows a TLP for use with an embodiment of the invention.

Electromagnetic radiation 1001 may be transmitted by TLP 1004 to curved surface 1003, modifying the area and the divergence angle of the light along the length of TLP 1004. Curved surface 1003 then further adjusts the divergence angle of the light to more closely match the predicted values. Curved surface 1003 may also direct the beams of the light to have more uniform angular distribution from point to point, making the output substantially telecentric. In one embodiment, input end 1007 of the TLP 1004 can have an octagonal shape such that the output NA distribution is more circular, as shown in FIG. 25.

The taper transition of TLP 1004 can be straight or curved depending on the particular applications. The curved surface 1003 and TLP 1004 can be made in one piece, or made separately and assembled together. If the curved surface 1003 and TLP 1004 are separate pieces, the refractive indices between the curved surface 1003 and the TLP 1004 should be matched. TLP 1004 can be made with cladding or without. The output surface of TLP 1004 can also be curved for proper matching to specific lenses.

Reflector 1008 may be coated with a coating that reflects only a pre-specified portion of the electromagnetic radiation spectrum. For example, the coating may only reflect visible light radiation, a pre-specified band of radiation, or a specific color of radiation. Reflector 1008 may further be a portion of substantially ellipsoidal, toroidal, spheroidal, or paraboloidal surfaces of revolution.

Figure 26:
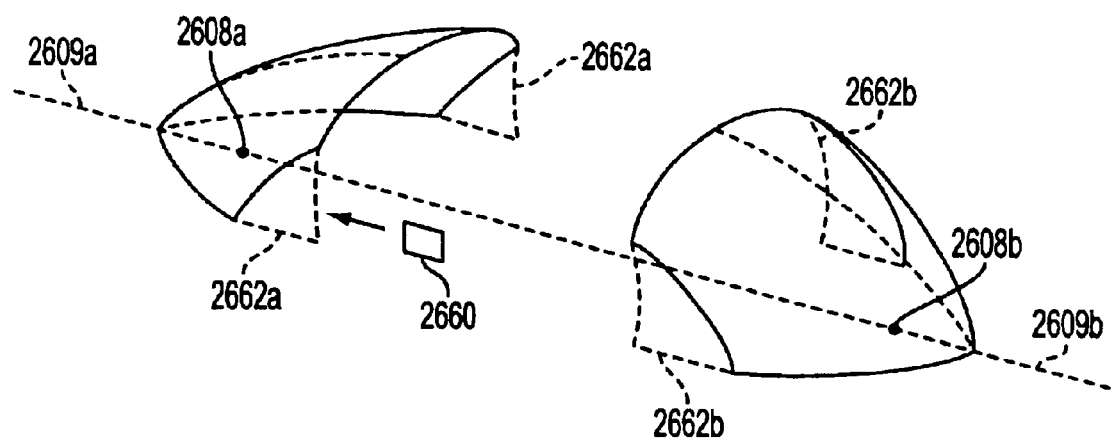
FIG. 26 shows a collecting and condensing system according to a fifteenth embodiment of the invention.

In a fifteenth embodiment, shown in FIG. 26, reflectors 2608a and 2608b are placed facing each other in a substantially symmetric relationship. A corner 2662a of primary reflector 2608a may be truncated along a plane 2660 substantially parallel to first optical axis 2609a. In this way an overall width of primary reflector 2608a may be less than the diameter of the half circle formed by the output side of primary reflector 2608a.

Plane 2660 may be substantially parallel to second optical axis 2609b, as well, since first optical axis 2609a may substantially collinear to second optical axis 2609b. A corner 2662b of secondary reflector 2608b may be truncated along a plane 2660 substantially parallel to first optical axis 2609a. In this way an overall width of secondary reflector 2608b may be less than the diameter of the half circle formed by the output side of secondary reflector 2608b.

The loss of radiation due to the missing corners 2662a and 2662b is estimated to be on the order of 10% or 20%. Although primary and secondary reflectors 2608a and 2608b are shown having a gap between them for clarity, they may also be placed adjacent to one another. This allows primary and secondary reflectors 2608a and 2608b to be made in one piece by, e.g. glass molding.

Figure 28:
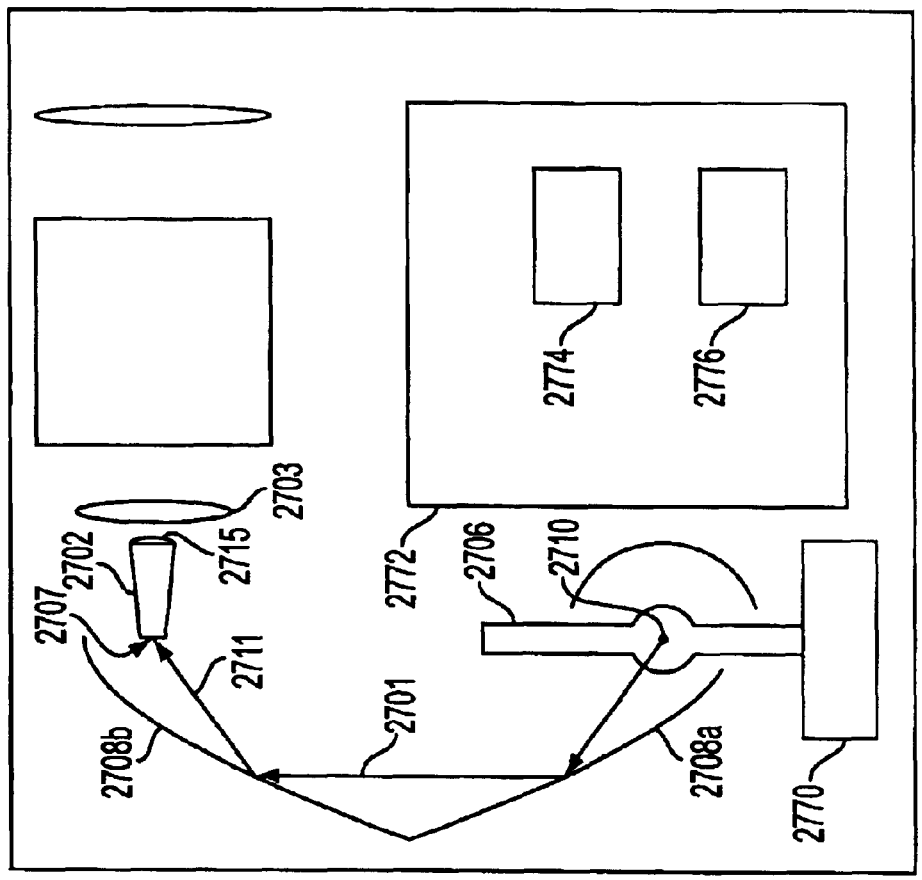
FIG. 28 shows a side view of the embodiment shown in FIG. 27.
Figure 27:
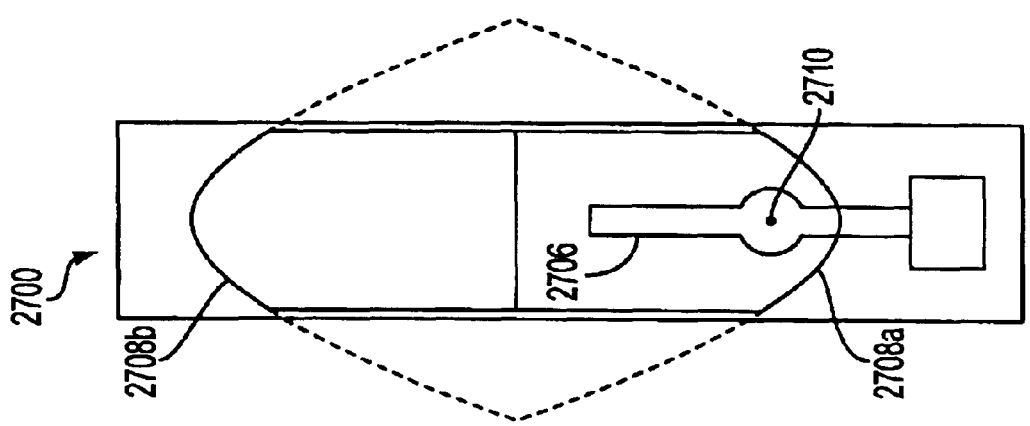
FIG. 27 shows a top view of a portable front projection system according to a sixteenth embodiment of the invention.

In FIGS. 27 and 28 is shown a portable front projection system 2700 according to a sixteenth embodiment of the invention. Primary and secondary reflectors 2708a and 2708b, which may have truncated corners, are placed substantially symmetrically opposite one another. A source 2706 placed substantially proximate to a first focal point 2710 of primary reflector 2708a reflects radiation 2701 from source 2706 toward secondary reflector 2708b, and thence to a second focal point 2707 of secondary reflector 2708b. An optical coupling element 2702 composed of a curved surface 2703 at an output end 2715 of a tapered light pipe (TLP) 2704 may be located such that input end 2711 is proximate to second focal point 2707 to collect and transmit radiation 2701 to, e.g. a projection system.

Source 2706 may, e.g. be removably disposed in a fixture 2770 so that the source 2706 can be removed or replaced at the end of its useful life. The fixture may be, e.g. a fixture of the '3:2:1' variety described in U.S. Pat. No. 5,598,497, the disclosure of which is included by reference.

A power supply 2772 for source 2706 may be disposed proximate source 2706, along with electronics 2774 and ballasts 2776 as appropriate.

In a third embodiment, also shown in FIG. 10a, a retro-reflector 1012 may be placed to reflect at least part of that portion of electromagnetic radiation 1001 that does not impinge directly on reflector 1008 back toward reflector 1008 through first focal point 1010 to increase the flux intensity of the converging rays. In a preferred embodiment, additional reflector 1012 may be a spherical retro-reflector disposed on the side of source 1006 opposite reflector 1008 to reflect electromagnetic radiation 1001 emitted from source 1006 in a direction away from reflector 1008 back toward reflector 1008 through first focal point 1010 of reflector 1008.

In one embodiment, source 1006 may be a light-emitting arc lamp. Source 1006 may be, e.g., a xenon lamp, a metal halide lamp, an HID lamp, or a mercury lamp. In an alternative embodiment, source 1006 may be a filament lamp.

In a fourth embodiment, also shown in FIG. 10a, the electromagnetic radiation 1001 collected and condensed by optical coupling element 1002 may be coupled to an intermediate waveguide 1013 such as a single core optic fiber, a fiber bundle, a fused fiber bundle, a polygonal rod, or a hollow reflective light pipe. The cross-section of the intermediate waveguide 1013 may be circular, polygonal, tapered, or a combination thereof. Optical coupling element 1002 and waveguide 1013 may be made of a material such as, e.g. quartz, glass, plastic, or acrylic. A fiber optic 1014 may be illuminated by the electromagnetic radiation 1001 collected and condensed at optical coupling element 1002.

Figure 11:
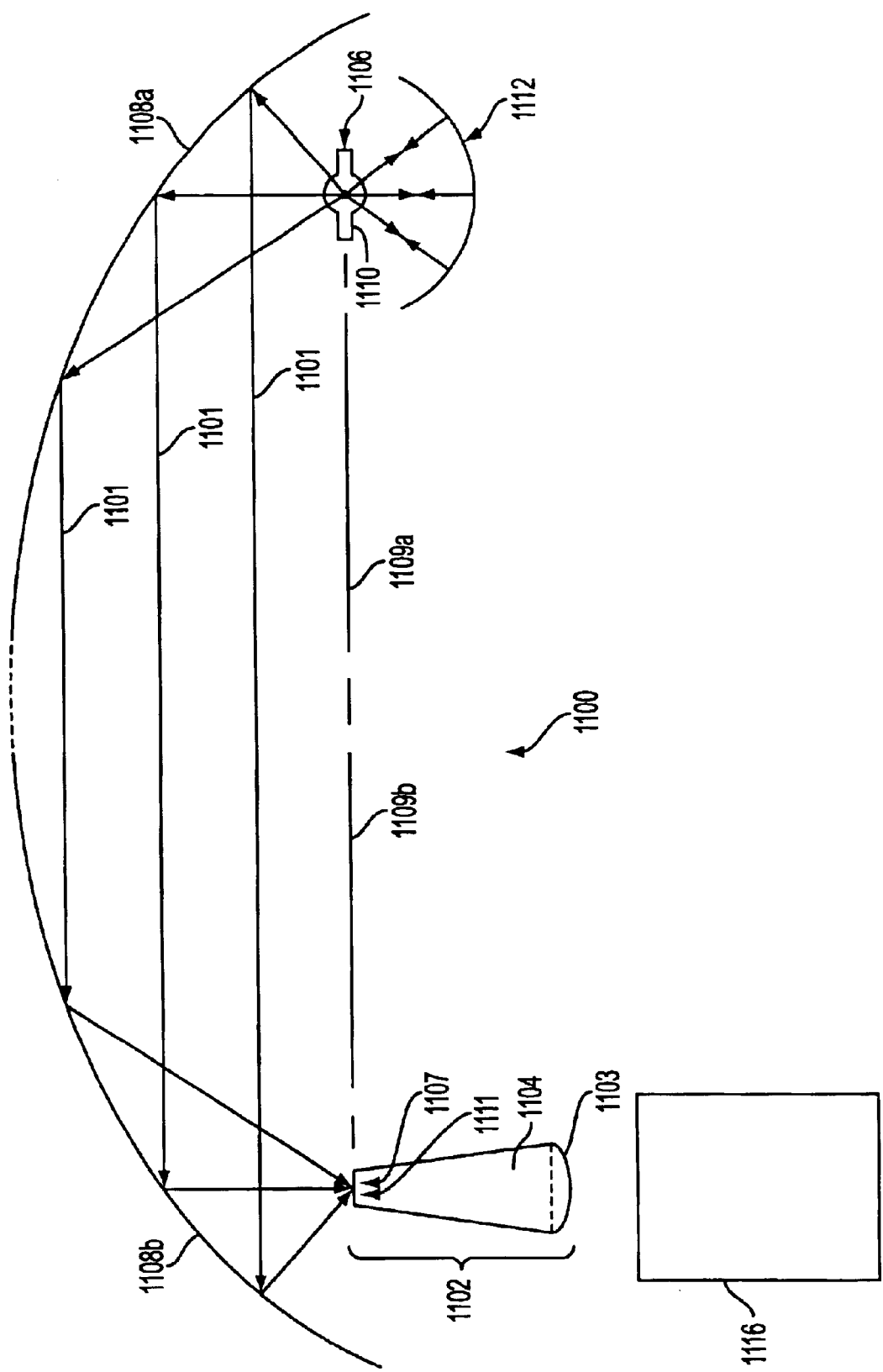
FIG. 11 shows a collecting and condensing system according to a fifth embodiment of the invention.

In a fifth embodiment, as shown in FIG. 11, the electromagnetic radiation 1101 collected and condensed by optical coupling element 1102 may be coupled to a projection engine 1116.

Figure 12:
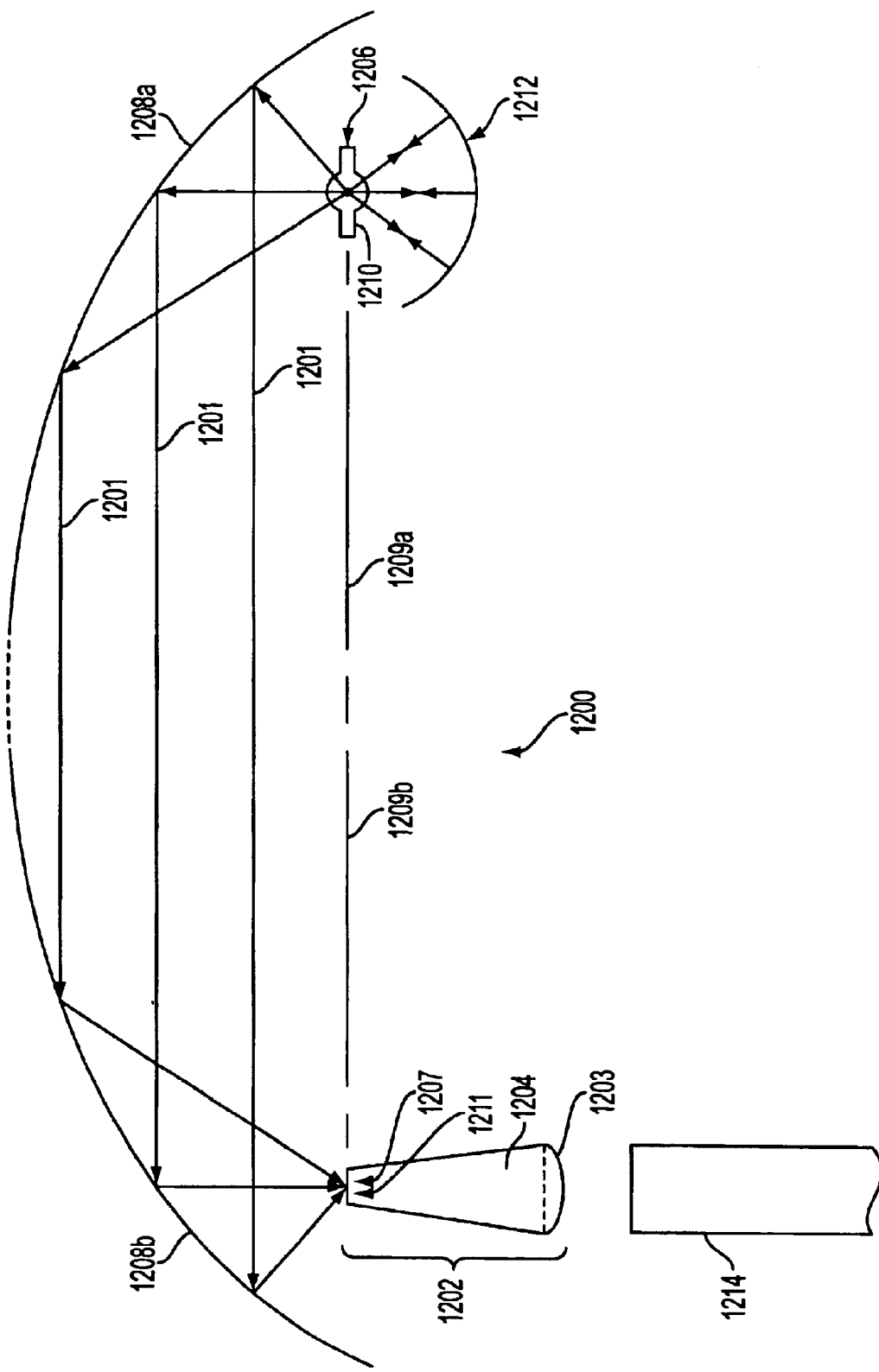
FIG. 12 shows a collecting and condensing system according to a sixth embodiment of the invention.

In a sixth embodiment, as shown in FIG. 12, a fiber optic 1214 may be illuminated by the electromagnetic radiation 1201 collected and condensed at optical coupling element 1202 directly. Fiber optic 1214 transmits and releases the collected and condensed electromagnetic radiation 1201 to provide illumination at a desired location.

Figure 13:
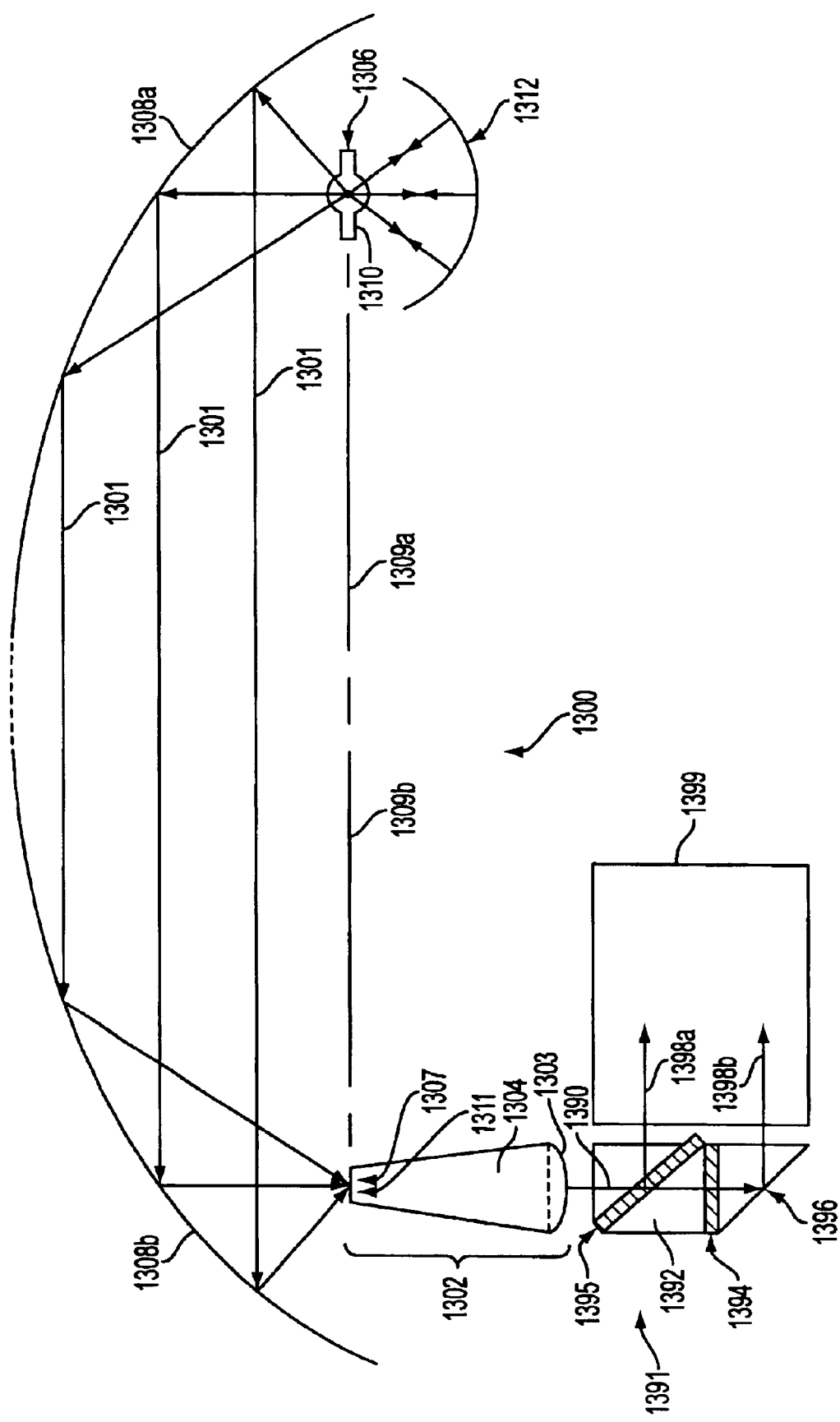
FIG. 13 shows a collecting and condensing system according to a seventh embodiment of the invention.

In a seventh embodiment, as shown in FIG. 13, a waveguide based polarization recovery system 1300 may be situated to receive light exiting curved surface 1303. A polarization beam splitter 1391, composed of e.g. two prisms 1390, 1392 in contact with a polarizing film 1395, receives, e.g., unpolarized light from curved surface 1303 and resolves it into a pair of orthogonally polarized beams 1398p and 1398s. Polarized beam 1398p may be of a polarization, e.g., TE, that may be redirected to output light guide 1399, while polarized beam 1398s may be of a polarization, e.g., TM, that is not. Polarized beam 1398s instead passes though half-wave plate 1394 with its fast axis at 45° to the TM plane, thus rotating the polarization of polarized beam 1398s by 90° to match the polarization of polarized beam 1398p. Polarized beam 1398s may then re-directed by prism 1396 into output light guide 1399 as well. The light in output light guide 13099 may thus all be of substantially similar polarization.

Figure 14:
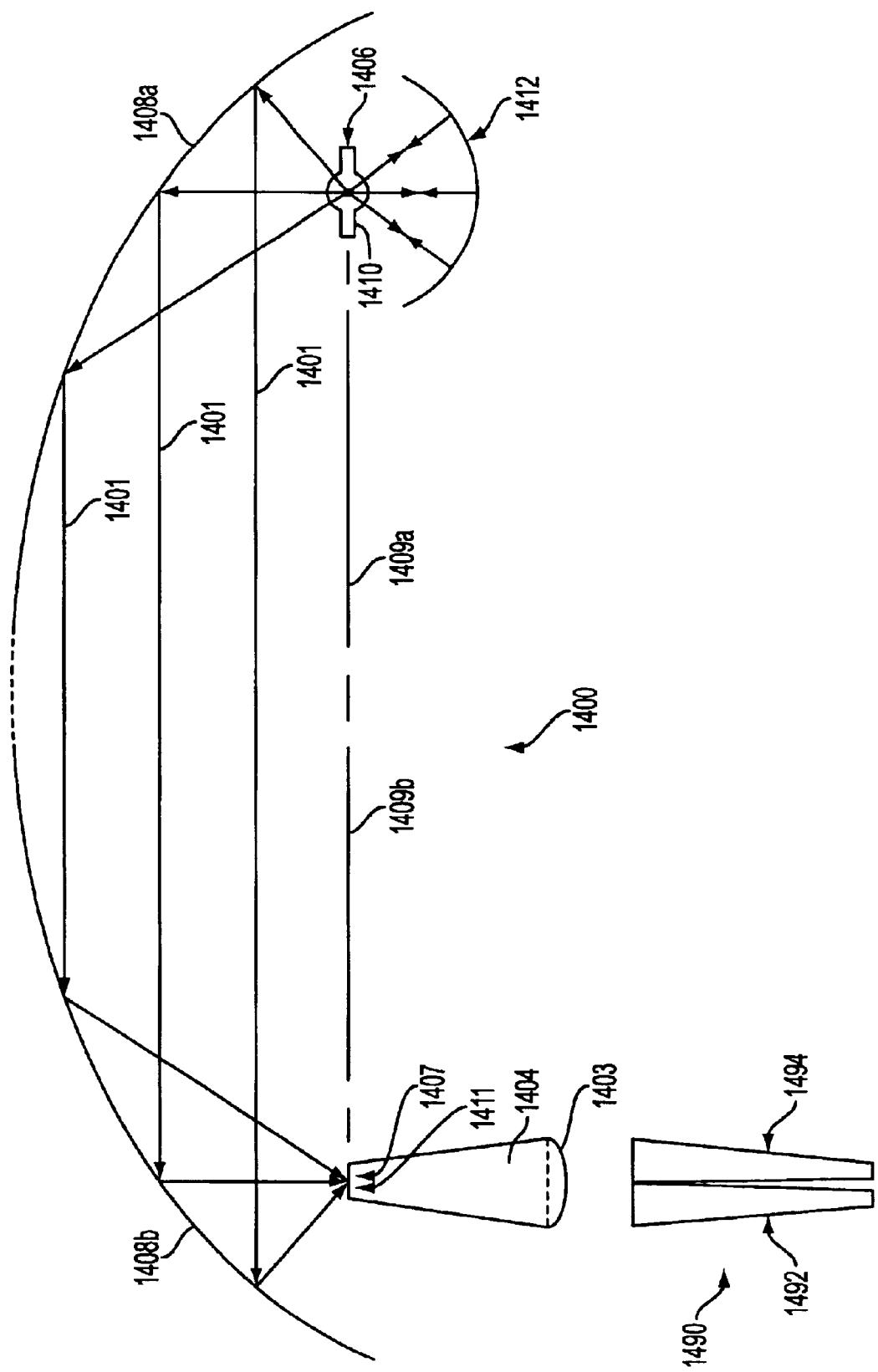
FIG. 14 shows a collecting and condensing system according to a eighth embodiment of the invention.

In an eighth embodiment, as shown in FIG. 14, an optical power splitter 1490 may be situated to receive light exiting curved surface 1403. Optical power splitter 1490 may include two or more optical light guides. In particular, for two light guides, first and second output light guides 1492 and 1494 may be situated to receive substantially equal proportions of light exiting curved surface 1403.

Figure 15:
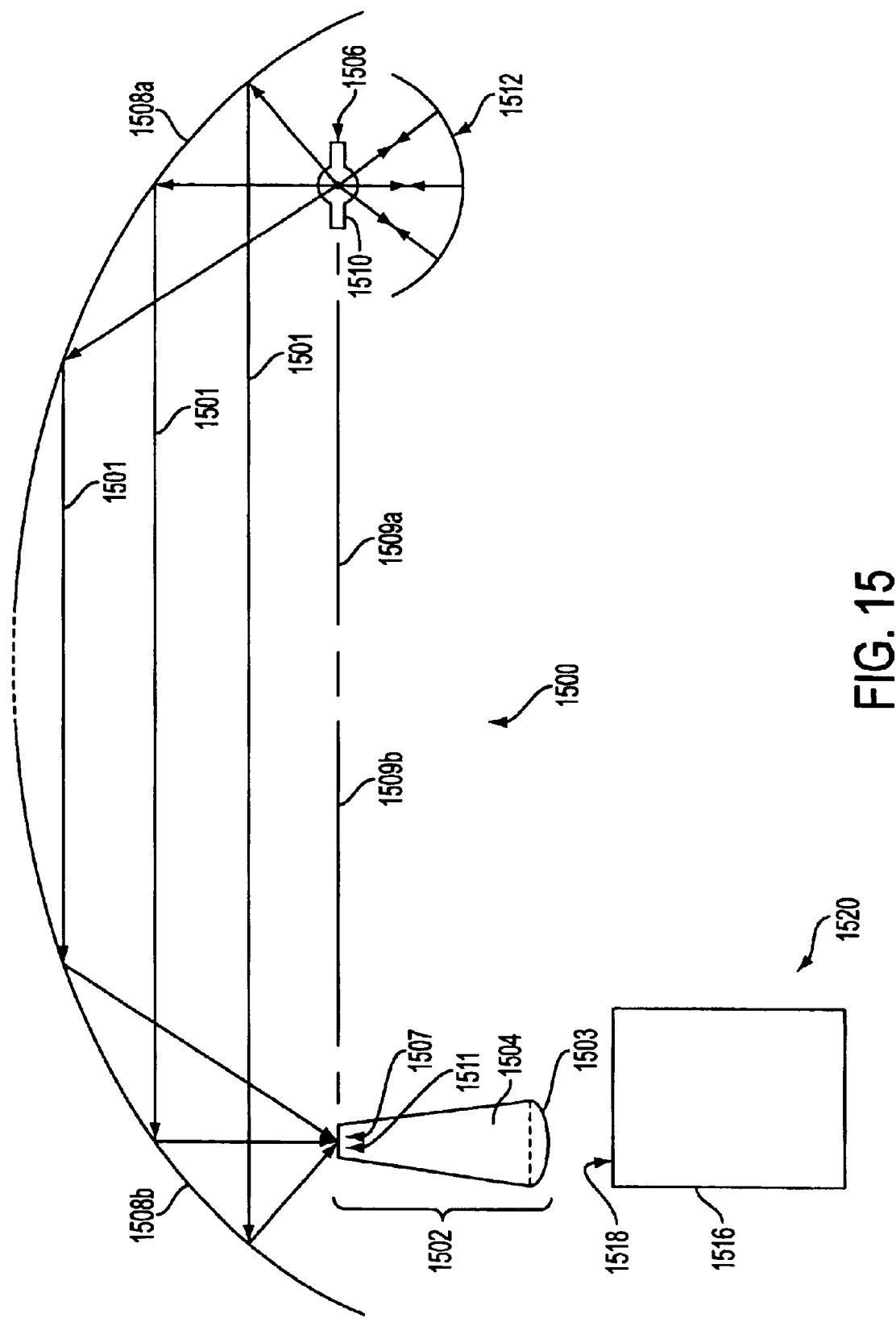
FIG. 15 shows a collecting and condensing system according to a ninth embodiment of the invention.

In an ninth embodiment, as shown in FIG. 15, a second light pipe 1516 having an input surface 1518 and an output surface 1520 may be placed so that input surface 1518 may be proximate to curved surface 1503 of TLP 1504 to collect and transmit substantially all of said radiation 1501. In one embodiment, input surface 1518 may be substantially larger than curved surface 1503. In a preferred embodiment, input surface 1518 may be substantially twice as large as said curved surface 1503.

Figure 15A:
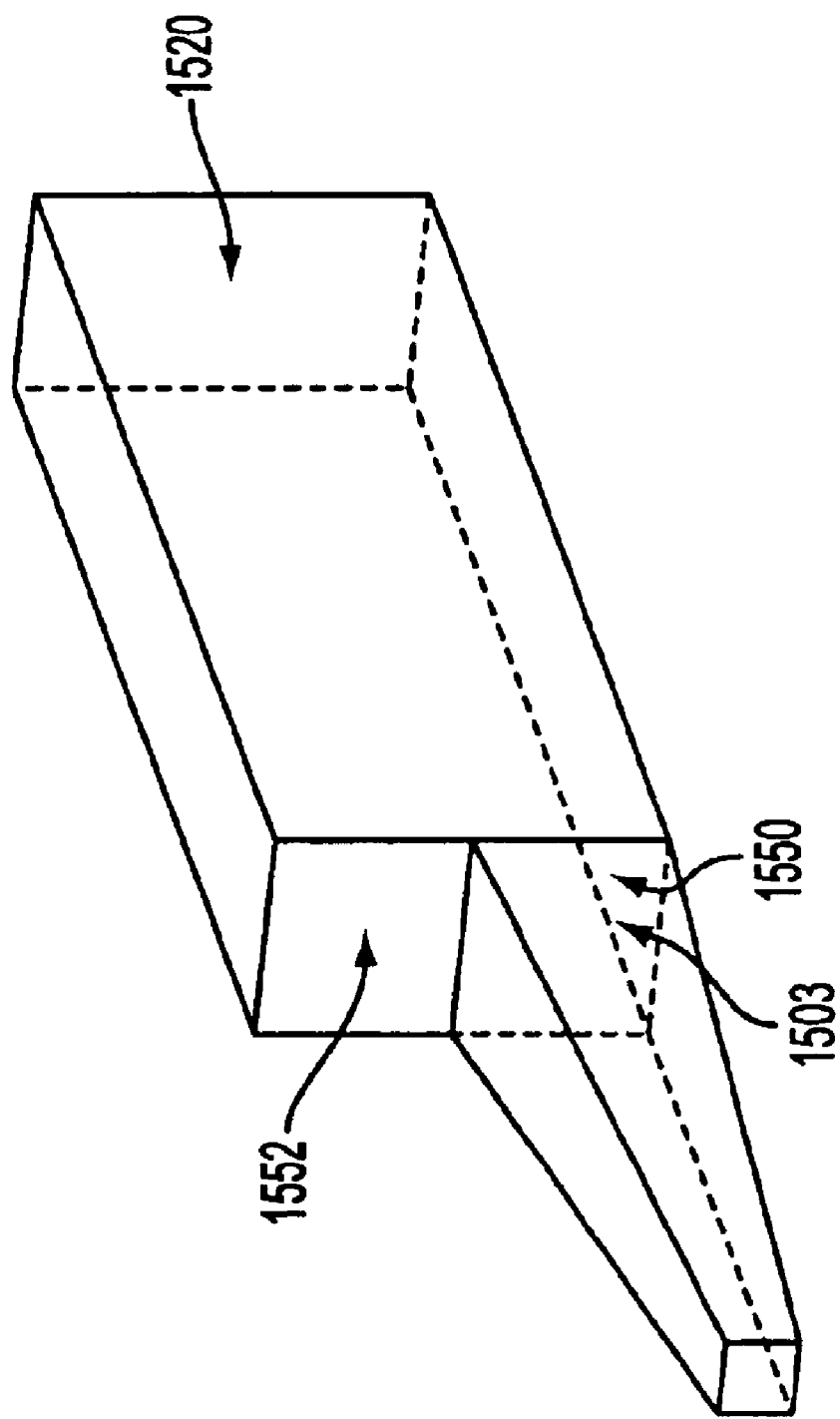

In one embodiment, as shown in FIG. 15*a*, input surface 1518 may be made up of a first area 1550 coextensive with curved surface 1503 and a second area 1552 not coextensive with said curved surface 1503. In another embodiment, second area 1552 may be coated with a reflective coating to reflect radiation back toward output surface 1520.

In another embodiment, as shown in FIG. 15*b*, a wave-plate 1554 may be disposed proximate to second area 1552 with a reflective coating on its outside surface, to reflect radiation back through wave-plate 1554 toward output surface 1520. In this way radiation returned from, e.g. a polarizer with a particular polarization may be re-polarized, such as, e.g. circularly polarized, and re-used.

Figure 15C:
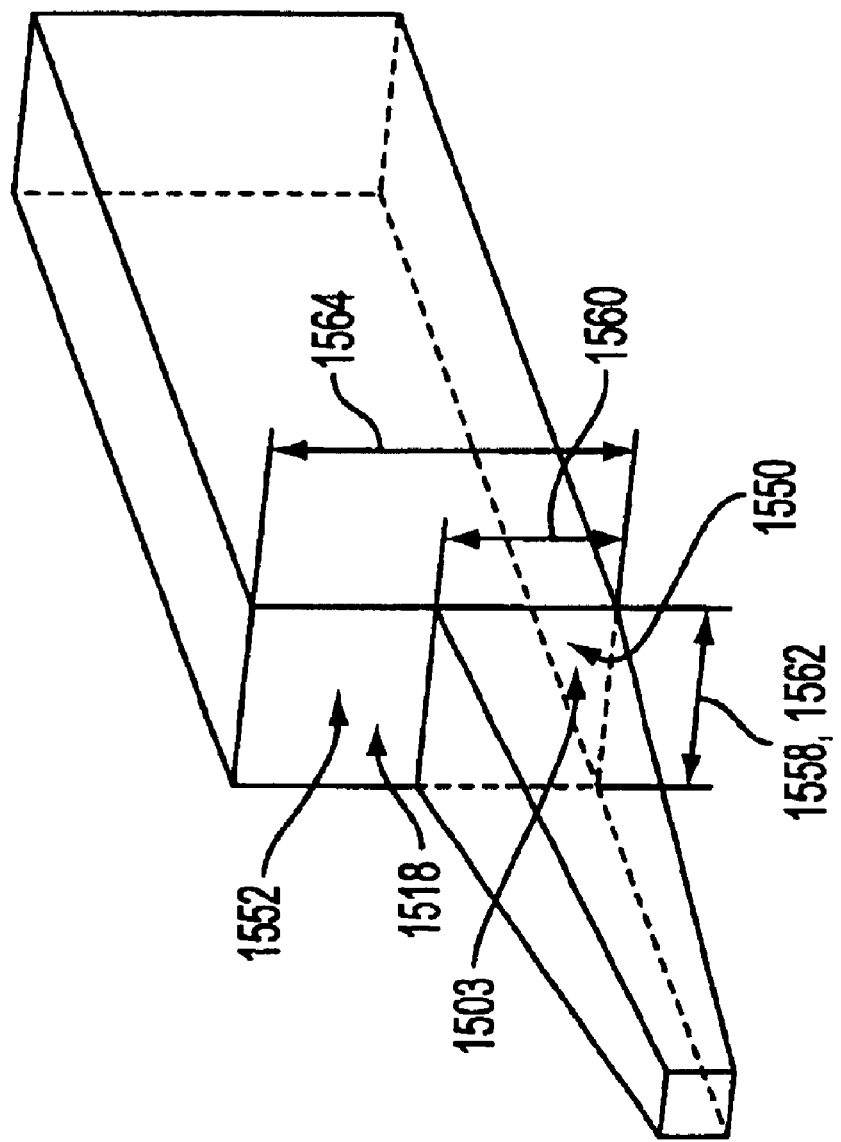

In a further embodiment, as shown in FIG. 15*c*, curved surface 1503 has a first dimension 1558 and a second dimension 1560, second dimension 1560 being substantially orthogonal to first dimension 1558. Input surface 1518 has a third dimension 1562 and a fourth dimension 1564, third dimension 1562 being substantially orthogonal to fourth dimension 1564. First dimension 1558 may be substantially parallel to and equal to third dimension 1562 while fourth dimension 1564 may be substantially parallel to and twice said second dimension 1560. The designation of first, second, third and fourth dimensions are, of course, arbitrary and may be interchanged without deviating from the spirit of the invention.

Second light pipe 1516 may be made of a material such as, e.g. quartz, glass, plastic, or acrylic. Second light pipe 1516 may be, e.g. an SLP or a TLP. Second light pipe 1516 may be, e.g. substantially hollow.

Figure 23A:
FIG. 23 shows some representative cross-sections of an input surface for use with an embodiment of the invention.
Figure 23B:
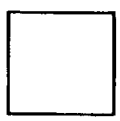
Figure 23C:
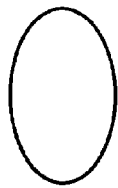
Figure 23D:
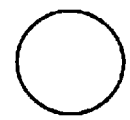
Figure 23E:
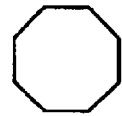
Figure 23F:
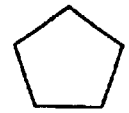

Input surface 1518 of second light pipe 1516 may have, e.g. a rectangular cross-section as shown in FIG. 23*a*, a square cross-section as shown in FIG. 23*b*, an elliptical cross-section as shown in FIG. 23*c*, a circular cross-section as shown in FIG. 23*d*, an octagonal cross-section as shown in FIG. 23*e*, a hexagonal cross-section as shown in FIG. 23*f*, or a polygonal cross-section.

Output surface 1520 may have, e.g. a rectangular cross-section as shown in FIG. 24*a*, a square cross-section as shown in FIG. 24*b*, an elliptical cross-section as shown in FIG. 24*c*, a circular cross-section as shown in FIG. 24*d*, an octagonal cross-section as shown in FIG. 24*e*, a hexagonal cross-section as shown in FIG. 24*f*, or a polygonal cross-section. Output surface 1520 may be, e.g. substantially convex.

Figure 16:
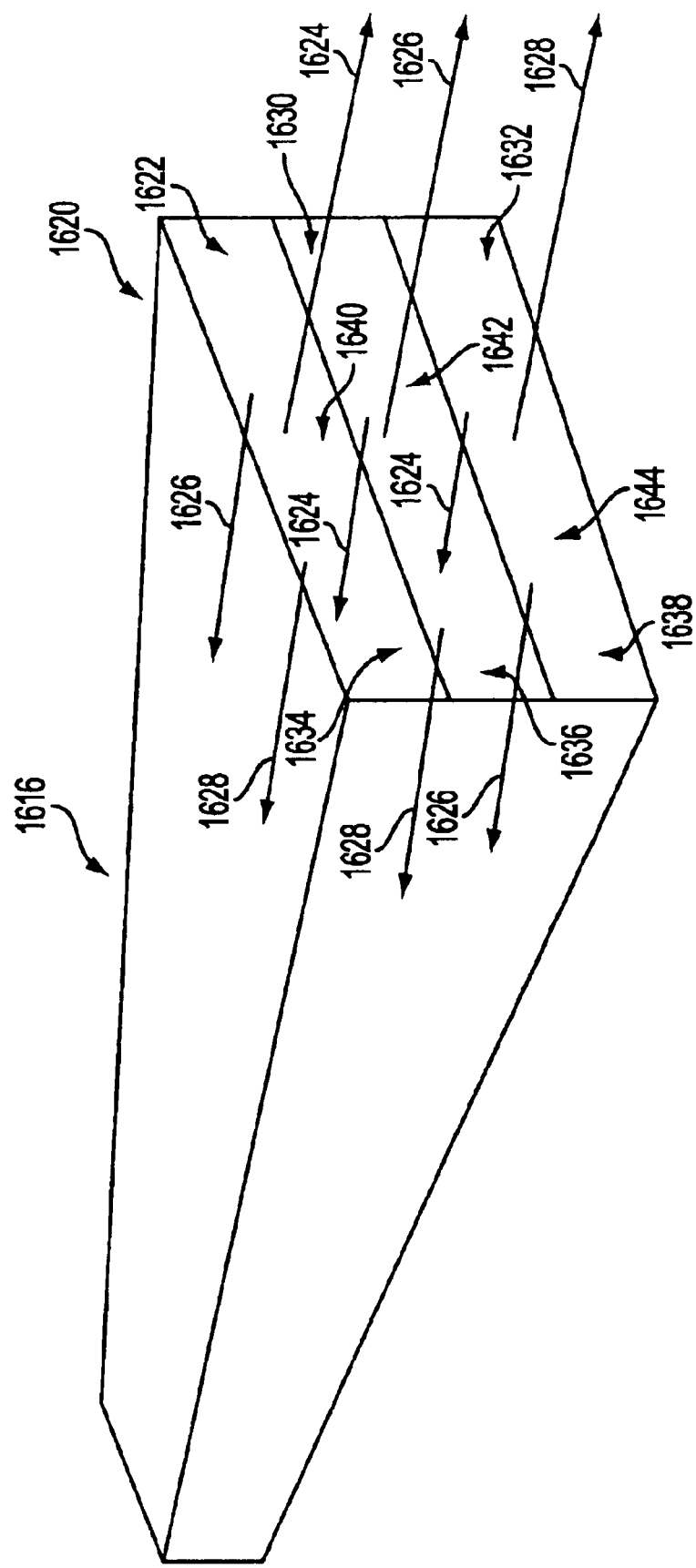
FIG. 16 shows a collecting and condensing system according to a tenth embodiment of the invention.

In a tenth embodiment, as shown in FIG. 16, a primary reflector 1622 may be disposed proximate to output surface 1620 of light pipe 1616. Primary reflector 1622 transmits a first band of radiation 1624 while reflecting second and third bands of radiation 1626, 1628. A secondary reflector 1630 may also disposed proximate to output surface 1620, near primary reflector 1622. Secondary reflector 1630 transmits second band of radiation 1626 while reflecting first and third bands of radiation 1624, 1628. A third reflector 1632 may also be disposed proximate to output surface 1620, near first and secondary reflectors 1622, 1630. Third reflector 1632 transmits third band of radiation 1628 while reflecting first and second bands of radiation 1624, 1626.

First, second, and third bands of radiation 1624, 1626, 1628 might be, e.g. red, orange, yellow, green, blue, indigo, violet, pink, white, magenta, infrared, or ultra-violet radiation. In a preferred embodiment first, second, and third bands of radiation 1624, 1626, 1628 are red, green, and blue radiation, in no particular order.

As shown in FIG. 16, first, second, and third reflectors 1622, 1630, and 1632 may be placed parallel to each other, although they could overlap somewhat. In one embodiment, output surface 1620 could be, e.g. divided into a first, second, and third areas 1634, 1636, 1638. In this case primary reflector 1622 could be, e.g. a first reflective coating 1640 over first area 1634. Secondary reflector 1630 could be, e.g. a second reflective coating 1642 over second area 1636. Third reflector 1632 could be, e.g. a third reflective coating 1644 over third area 1638.

Figure 17:
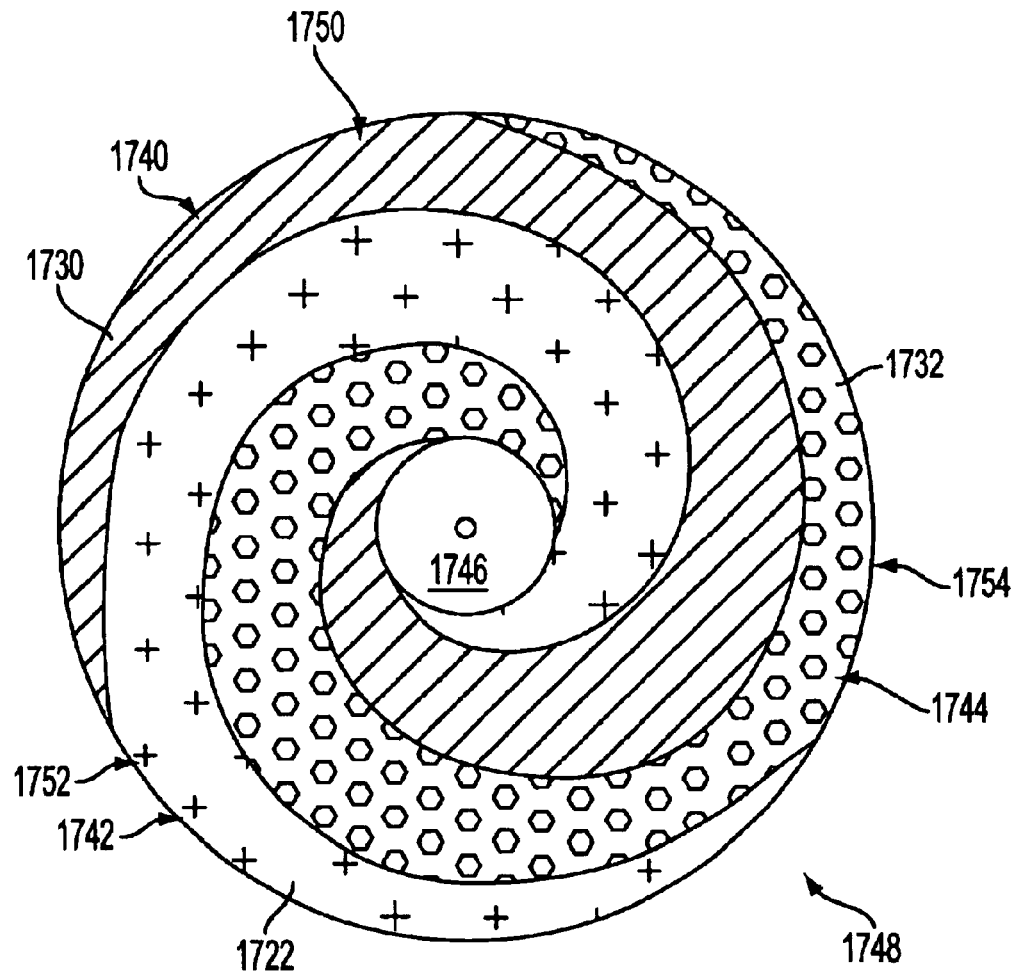
FIG. 17 shows a collecting and condensing system according to a eleventh embodiment of the invention.

In an eleventh embodiment, as shown in FIG. 17, first, second, and third reflectors 1722, 1730, and 1732 could be, e.g. distributed around a shaft 1746, in the manner of a color wheel 1748. Color wheel 1748 may be, e.g. rotatably mounted on shaft 1746 and have a surface composed of a first, second, and third areas 1750, 1752, 1754 disposed spirally about shaft 1746. In this case primary reflector 1722 could be, e.g. a first reflective coating 1740 over first area 1750. Secondary reflector 1730 could be, e.g. a second reflective coating 1742 over second area 1752. Third reflector 1732 could be, e.g. a third reflective coating 1744 over third area 1754.

Figure 18:
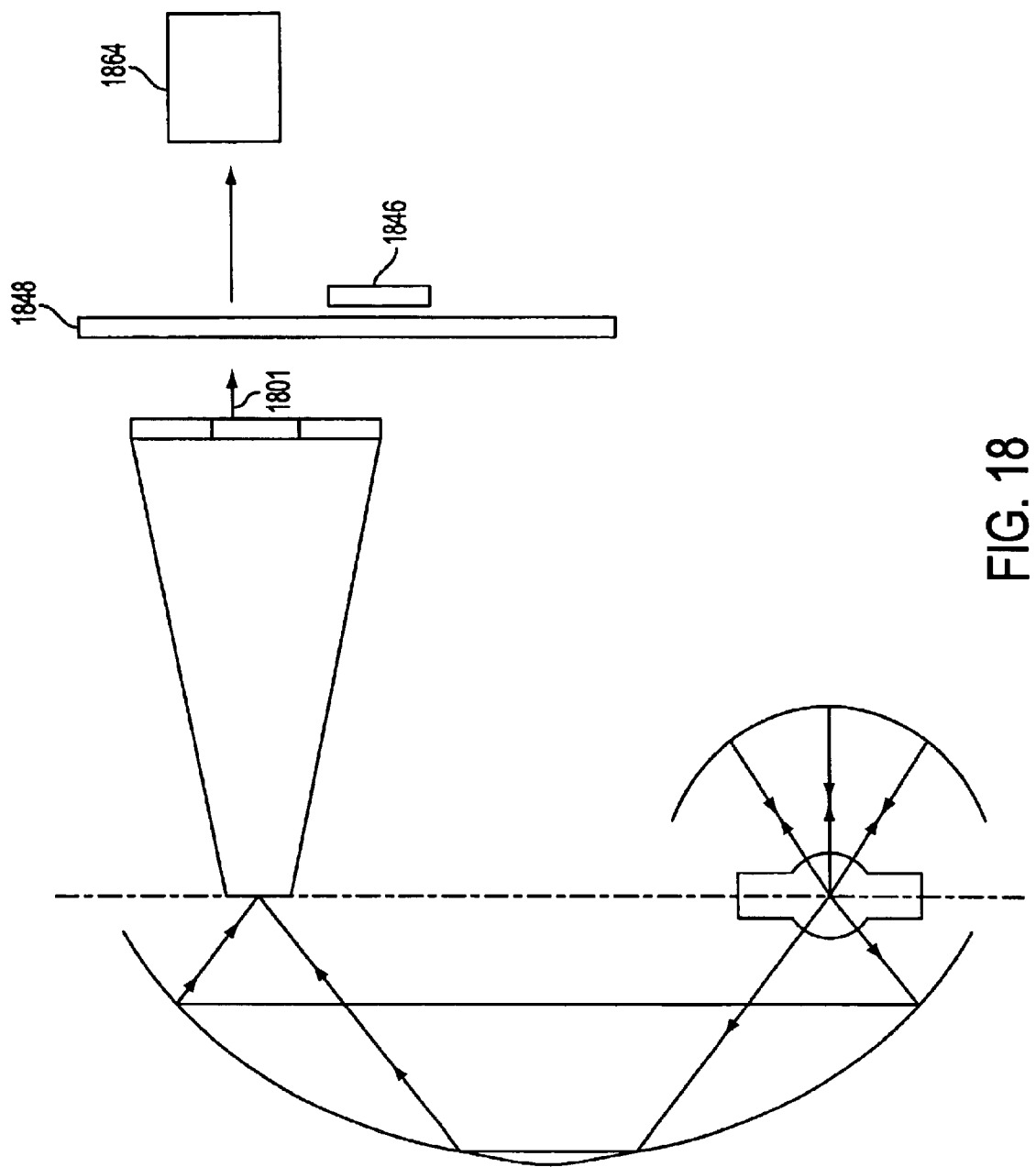
FIG. 18 shows a collecting and condensing system according to a twelfth embodiment of the invention.

In a twelfth embodiment, as shown in FIG. 18, color wheel 1848 may be, e.g. rotated by an electric motor turning shaft 1846, Radiation 1801 incident on color wheel 1848 may go through a sequence as color wheel 1848 rotates, producing scrolling color bands. The scrolling color bands may be collected and focused onto an image projection system 1864. The imager may be synchronized to the color wheel and modulated, thus producing an image that may be projected onto a screen.

Figure 19:
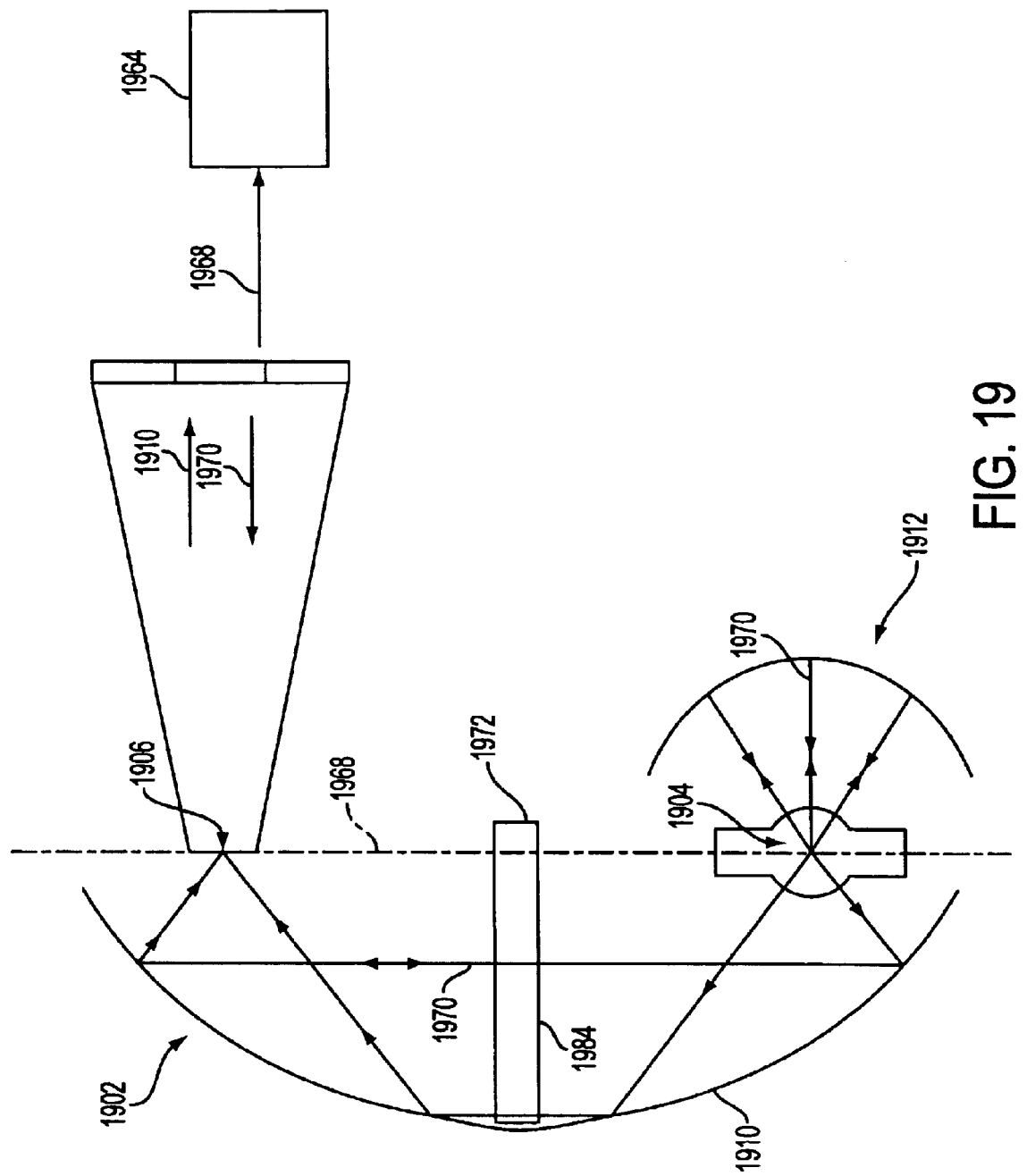
FIG. 19 shows a collecting and condensing system according to a thirteenth embodiment of the invention.

In an thirteenth embodiment, as shown in FIG. 19, a reflective polarizer 1966 may be disposed proximate to output surface 1920 to collect and polarize substantially all of radiation 1910 into a first polarization 1968 and a second polarization 1970. For example, radiation of first polarization 1968 may be, e.g. p-polarized radiation, while radiation of second polarization 1970 may be, e.g. s-polarized radiation. The order of polarizations may, of course, be reversed. In one embodiment, reflective polarizer 1966 may be, e.g. a wire-grid polarizer.

A reflective polarizer 1966 might be used if, e.g. image projection system 1964 was of a type that required polarized light, such as, e.g. a liquid crystal on silicon (LCOS) imager. In this case, if image projection system 1964 were constructed and arranged to, e.g. utilize radiation of first polarization 1968, p-polarized radiation 1968 may be transmitted to image projection system 1964 while s-polarized radiation 1970, which may be unusable by image projection system 1964 directly, may be reflected substantially back towards the input.

S-polarized radiation 1970 will be returned through second focal point 1911 to reflector 1908, and ultimately to first focal point 1910. Some of s-polarized radiation 1970 may pass through first focal point 1910 and be reflected by retro-reflector 1912. There will be substantially no loss of etendue since the recovered s-polarized radiation 1970 follows a path through first focal point 1910 and thus appears to be emitted by source 1906.

The steps of a method for collecting electromagnetic radiation emitted by a source of electromagnetic radiation and focusing the collected radiation onto a target, according to a fourteenth embodiment of the invention, are as follows: position a source of electromagnetic radiation substantially at a first focal point of a primary reflector; produce rays of radiation by the source; reflect the rays of radiation by the primary reflector substantially towards a secondary reflector; substantially converge the rays of radiation at a second focal point of the secondary reflector; position a substantially TLP so that its input end (which may, e.g. have a cross-section that is rectangular, elliptical, or octagonal) may be substantially proximate to the second focal point of the secondary reflector; position a curved surface so that a center of the curved surface may be substantially proximate to the output end of the TLP; pass the rays of radiation reflected by the reflector through the substantially TLP of the optical coupling element and toward the curved surface; adjust the area or the divergence angle of the light as it passes through the substantially TLP of the optical coupling element and toward the curved surface.

While the invention has been described in detail above, the invention is not intended to be limited to the specific embodiments as described. In particular, the embodiments described above may also be applied to standard on-axis elliptical and parabolic reflectors. It is evident that those skilled in the art may now make numerous uses and modifications of and departures from the specific embodiments described herein without departing from the inventive concepts.

What is claimed is:

1. A TLP comprising;
   an input end;
   a substantially convex output end substantially transparently connected to said input end;
   said input end being illuminated with electromagnetic radiation;
   wherein a first NA of said radiation is transformed into a second NA by said TLP; and
   wherein said first NA is substantially unequal to said second NA.

2. The TLP of claim 1, comprising further a source of said electromagnetic radiation, said source comprising:
   a reflector having a first and a second focal points;
   said source being located proximate to said first focal point of said reflector to produce rays of radiation that reflect from said reflector to converge substantially at said second focal point; and
   wherein said input end of said TLP is located proximate to said second focal point of said secondary reflector.

3. The TLP of claim 2, wherein said reflector comprises a primary reflector having a first optical axis, and said first focal point is a focal point of said primary reflector, said reflector comprising further:
   a secondary reflector having a second optical axis placed substantially symmetrically to said primary reflector such that said first and second optical axes are substantially collinear, and wherein said second focal point is a focal point of said secondary reflector; and
   wherein said rays of radiation reflect from said primary reflector toward said secondary reflector and converge substantially at said second focal point.

4. The TLP of claim 3, wherein:
   said primary reflector comprises at least a portion of a substantially elliptical surface of revolution; and
   said secondary reflector comprises at least a portion of a substantially hyperbolic surface of revolution.

5. The TLP of claim 3, wherein:
   said primary reflector comprises at least a portion of a substantially hyperbolic surface of revolution; and
   said secondary reflector comprises at least a portion of a substantially elliptical surface of revolution.

6. The TLP of claim 3, wherein:
   a corner of said primary reflector is truncated along a plane substantially parallel to said first optical axis.

7. The TLP of claim 3, wherein:
   a corner of said secondary reflector is truncated along a plane substantially parallel to said second optical axis.

8. The TLP of claim 2, wherein said reflector has a coating that reflects only a pre-specified portion of the electromagnetic radiation spectrum.

9. The TLP of claim 8, wherein said source comprises a light-emitting arc lamp.

10. The TLP of claim 9, wherein said arc lamp comprises a lamp selected from the group comprising a xenon lamp, a metal halide lamp, an HID lamp, or a mercury lamp.

11. The TLP of claim 2, comprising further a retro-reflector disposed opposite said reflector to reflect at least a portion of the electromagnetic radiation that does not impinge directly on said reflector toward said reflector through the first focal point of said reflector to increase the flux intensity of the converging rays.

12. The TLP of claim 11, wherein said retro-reflector comprises a spherical retro-reflector disposed on a side of said source opposite said primary reflector to reflect electromagnetic radiation emitted from said source in a direction away from said primary reflector toward said primary reflector through the first focal point of said primary reflector.

13. The TLP of claim 2, wherein said coating only reflects visible light radiation, a pre-specified band of radiation, or a specific color of radiation.

14. The TLP of claim 2, wherein said source comprises a filament lamp.

15. A NA conversion device comprising:
    a polygonal input end;
    an output end substantially transparently connected to said polygonal input end;
    said polygonal input end being illuminated with electromagnetic radiation;
    wherein a first NA of said radiation is transformed into a second NA by said TLP; and
    wherein said first NA is substantially unequal to said second NA.

16. The NA conversion device of claim 15, comprising further a source of said electromagnetic radiation, said source comprising:
    a reflector having a first and a second focal points;
    said source being located proximate to said first focal point of said reflector to produce rays of radiation that reflect from said reflector to converge substantially at said second focal point; and
    wherein said input end of said TLP is located proximate to said second focal point of said secondary reflector.

17. The NA conversion device of claim 16, comprising further:
    a second light pipe having an input surface and an output surface, said input surface of said second light pipe disposed proximate to said output end of said TLP to collect and transmit substantially all of said radiation;

a primary reflector disposed proximate to said output surface of said second light pipe, said primary reflector transmitting a first band of said radiation and reflecting a second and third bands of said radiation;

a secondary reflector disposed proximate to said output surface of said second light pipe, said secondary reflector transmitting said second band of said radiation and reflecting said first and third bands of said radiation; and a third reflector disposed proximate to said output surface of said second light pipe, said third reflector transmitting said third band of said radiation and reflecting said first and second bands of said radiation.

18. The NA conversion device of claim 17, wherein said input surface is substantially larger than said output end.

19. The NA conversion device of claim 18, wherein said input surface is substantially twice as large as said output end.

20. The NA conversion device of claim 18, wherein said input surface comprises a first area coextensive with said output end;

a second area not coextensive with said output end; and wherein said second area is coated with a reflective coating.

21. The NA conversion device of claim 18, wherein said input surface comprises a first area coextensive with said output end;

a second area not coextensive with said output end; and wherein a wave-plate is disposed proximate to said second area;

said wave-plate being coated with a reflective coating.

22. The NA conversion device of claim 17, comprising further:

a reflective polarizer disposed proximate said output surface, said reflective polarizer collecting and polarizing substantially all of said radiation into a first polarization and a second polarization;

wherein said radiation of said first polarization is transmitted; and radiation of said second polarization is reflected toward said output surface.

23. The light recovery apparatus of claim 22, wherein said reflective polarizer comprises a wire-grid polarizer.

24. The NA conversion device of claim 17, wherein:

said output end has a first dimension and a second dimension, said second dimension being substantially orthogonal to said first dimension;

said input surface has a third dimension and a fourth dimension, said third dimension being substantially orthogonal to said fourth dimension;

said first dimension is substantially equal to said third dimension; and said fourth dimension is substantially twice said second dimension.

25. The NA conversion device of claim 17, wherein said output surface comprises a first, second, and third areas; and said primary reflector is a first reflective coating over said first area;

said secondary reflector is a second reflective coating over said second area; and said third reflector is a third reflective coating over said third area.

26. The NA conversion device of claim 17, comprising further a color wheel rotatably mounted on a shaft and having a surface comprising a first, second, and third areas disposed spirally about said shaft; and wherein all of said input surface is substantially transmissive;

said primary reflector is a first reflective coating over said first area;

said secondary reflector is a second reflective coating over said second area; and said third reflector is a third reflective coating over said third area.

27. The NA conversion device of claim 17, wherein said second light pipe is selected from the group consisting of:

an SLP, and a TLP.

28. The NA conversion device of claim 17, wherein said second light pipe is substantially hollow.

29. The NA conversion device of claim 17, wherein a substantially anti-reflective coating is disposed on said input surface.

30. The NA conversion device of claim 17, wherein a substantially anti-reflective coating is disposed on said output surface.

31. The NA conversion device of claim 17, wherein said output surface is substantially convex.

32. The NA conversion device of claim 16, wherein said reflector comprises a primary reflector having a first optical axis, and said first focal point is a focal point of said primary reflector, said reflector comprising further:

a secondary reflector having a second optical axis placed substantially symmetrically to said primary reflector such that said first and second optical axes are substantially collinear, and wherein said second focal point is a focal point of said secondary reflector; and wherein said rays of radiation reflect from said primary reflector toward said secondary reflector and converge substantially at said second focal point.

33. The NA conversion device of claim 32, wherein:

said primary reflector comprises at least a portion of a substantially elliptical surface of revolution; and said secondary reflector comprises at least a portion of a substantially hyperbolic surface of revolution.

34. The NA conversion device of claim 32, wherein:

said primary reflector comprises at least a portion of a substantially hyperbolic surface of revolution; and said secondary reflector comprises at least a portion of a substantially elliptical surface of revolution.

35. The conversion device of claim 32, wherein:

a corner of said primary reflector is truncated along a plane substantially parallel to said first optical axis.

36. The conversion device of claim 32, wherein:

a corner of said secondary reflector is truncated along a plane substantially parallel to said second optical axis.

37. The NA conversion device of claim 16, comprising further a retro-reflector disposed opposite said reflector to reflect at least a portion of the electromagnetic radiation that does not impinge directly on said reflector toward said reflector through the first focal point of said reflector to increase the flux intensity of the converging rays.

38. The NA conversion device of claim 37, wherein said retro-reflector comprises a spherical retro-reflector disposed on a side of said source opposite said primary reflector to reflect electromagnetic radiation emitted from said source in a direction away from said primary reflector toward said primary reflector through the first focal point of said primary reflector.

39. The NA conversion device of claim 16, wherein said reflector has a coating that reflects only a pre-specified portion of the electromagnetic radiation spectrum.

40. The NA conversion device of claim 16, wherein said coating only reflects visible light radiation, a pre-specified band of radiation, or a specific color of radiation.

41. The NA conversion device of claim 15, wherein said output end is flat.

42. The NA conversion device of claim 15, wherein said output end is convex.

* * * * *